United States Patent
Yoshida

(10) Patent No.: US 11,809,118 B2
(45) Date of Patent: Nov. 7, 2023

(54) IMAGE FORMING APPARATUS

(71) Applicant: CANON KABUSHIKI KAISHA, Tokyo (JP)

(72) Inventor: Keisuke Yoshida, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 17/398,101

(22) Filed: Aug. 10, 2021

(65) Prior Publication Data

US 2022/0066377 A1    Mar. 3, 2022

(30) Foreign Application Priority Data

Aug. 28, 2020  (JP) ................................. 2020-144818

(51) Int. Cl.

| | | |
|---|---|---|
| *G03G 15/00* | (2006.01) | |
| *G06K 15/16* | (2006.01) | |
| *G06K 15/14* | (2006.01) | |
| *B65H 43/00* | (2006.01) | |
| *B65H 85/00* | (2006.01) | |
| *G06K 15/00* | (2006.01) | |
| *B65H 13/00* | (2006.01) | |

(52) U.S. Cl.
CPC ............. *G03G 15/70* (2013.01); *B65H 13/00* (2013.01); *B65H 85/00* (2013.01); *G03G 15/6552* (2013.01); *G06K 15/14* (2013.01); *G06K 15/16* (2013.01); *G06K 15/4085* (2013.01)

(58) Field of Classification Search
CPC .... G03G 15/70; G03G 15/6552; B65H 43/00; B65H 85/00; G03K 15/14; G03K 15/16; G03K 15/4085
See application file for complete search history.

(56) References Cited

U.S. PATENT DOCUMENTS

| | | |
|---|---|---|
| 4,593,992 A | 6/1986 | Yoshinaga et al. |
| 7,853,168 B2 | 12/2010 | Shimada |
| 2009/0162090 A1 | 6/2009 | Shimada |
| 2014/0098154 A1* | 4/2014 | Fujimoto ............... B41J 3/60 347/16 |
| 2021/0276340 A1* | 9/2021 | Nakano ................ B41J 2/18 |

FOREIGN PATENT DOCUMENTS

| | | |
|---|---|---|
| JP | 2006-208458 A | 8/2006 |
| JP | 2009-151087 A | 7/2009 |
| JP | 2017-097001 A | 6/2017 |
| JP | 2017-215464 A | 12/2017 |

* cited by examiner

*Primary Examiner* — David H Banh
(74) *Attorney, Agent, or Firm* — Venable LLP

(57) ABSTRACT

An image forming apparatus includes a stacking unit, a feeding unit, an image forming unit, a discharge stacking unit, a detecting unit, a double-side feeding passage, and a controller. In a case that subsequent to a current recording material, a subsequent recording material is discharged, the controller determines a feeding timing of the subsequent recording material depending on a discharge interval time from discharge of the current recording material on the discharge stacking unit to discharge of the subsequent recording material on the discharge stacking unit, and determines the discharge interval time on the basis of print information of at least the subsequent recording material.

16 Claims, 10 Drawing Sheets

IMAGE FORMING APPARATUS

FIELD OF THE INVENTION AND RELATED ART

The present invention relates to an image forming apparatus.

In an image forming apparatus of an electrophotographic type, image formation is carried out by transferring a formed toner image onto a recording material and then by heating and fixing the toner image on the recording material by a fixing device. At this time, depending on a melting point of toner, a distance from the fixing device to a discharge tray on which the recording material is to be discharged, and the like, the recording material discharged on the discharge tray and the toner on the recording material are not sufficiently cooled in some instances. Further, in the case where double-side printing in which images are printed on double (both) sides of the recording material is carried out, a recording material discharged early and a subsequent recording material thereto are stacked on the discharge tray in a state in which an upper surface of the early discharged recording material and a lower surface of the subsequent recording material are superposed with each other. As a result, when the recording material and the toner on the recording material are not sufficiently cooled, the superposed recording materials stick to each other by a melted toner (hereinafter, such a phenomenon is referred to as a discharged sheet sticking phenomenon). Further, when the stuck recording materials are peeled off, the toner is peeled off, so that an image defect occurs.

In order to solve the discharged sheet sticking phenomenon, for example, in Japanese Laid-Open Patent Application (JP-A) 2017-215464 and JP-A 2017-97001, methods in which the recording material and the toner on the recording material are cooled by lowering productivity (throughput) of image forming apparatuses have been proposed.

SUMMARY OF THE INVENTION

It is an object of the present invention is to suppress occurrence of a discharged sheet sticking phenomenon on a discharge tray.

Further features of the present invention will become apparent from the following description of exemplary embodiments with reference to the attached drawings.

Figure 5:
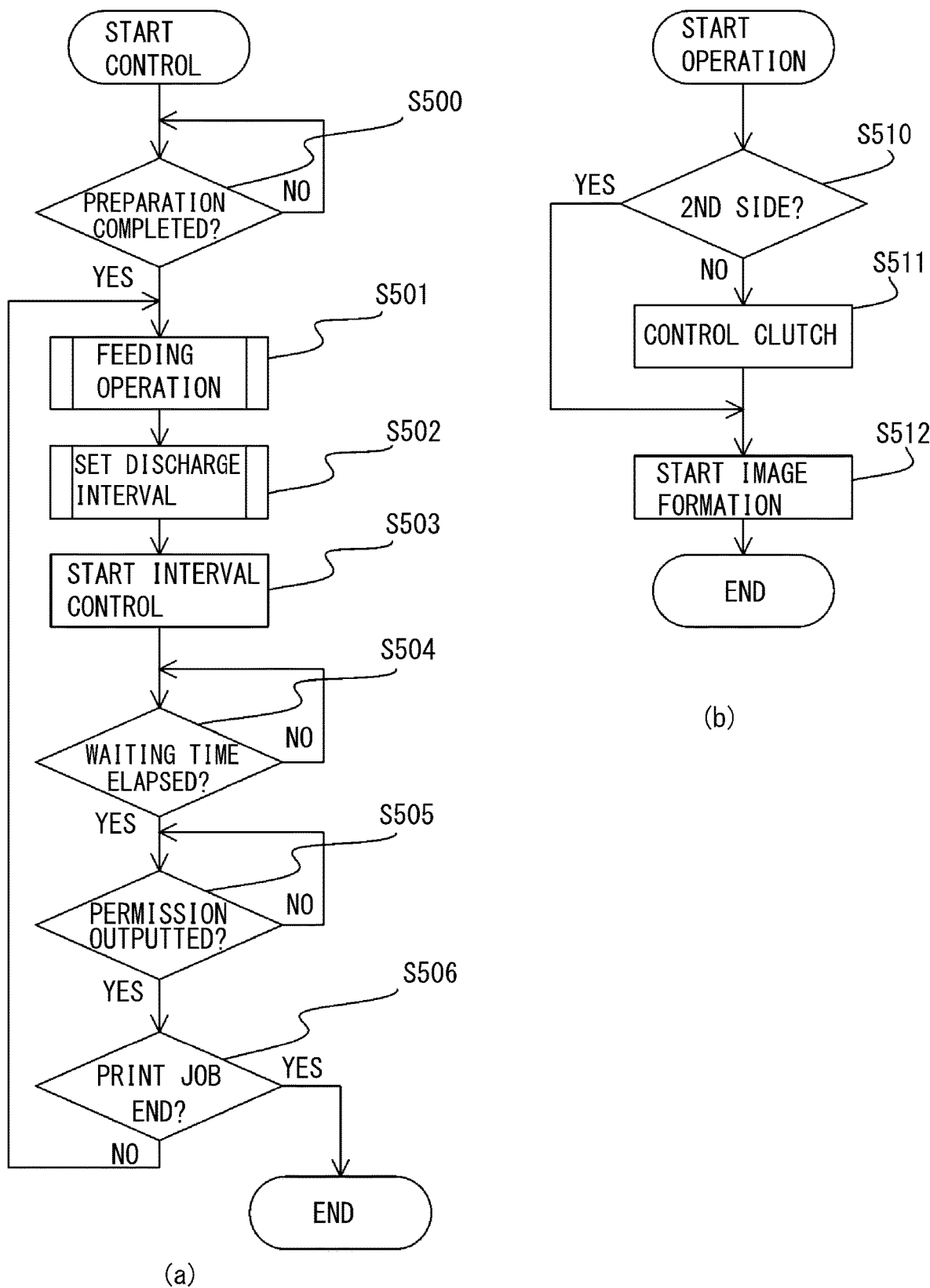

Parts (a) and (b) of FIG. 5 are flow charts each showing a control sequence for controlling sheet feeding in the embodiment 1.

Figure 6:
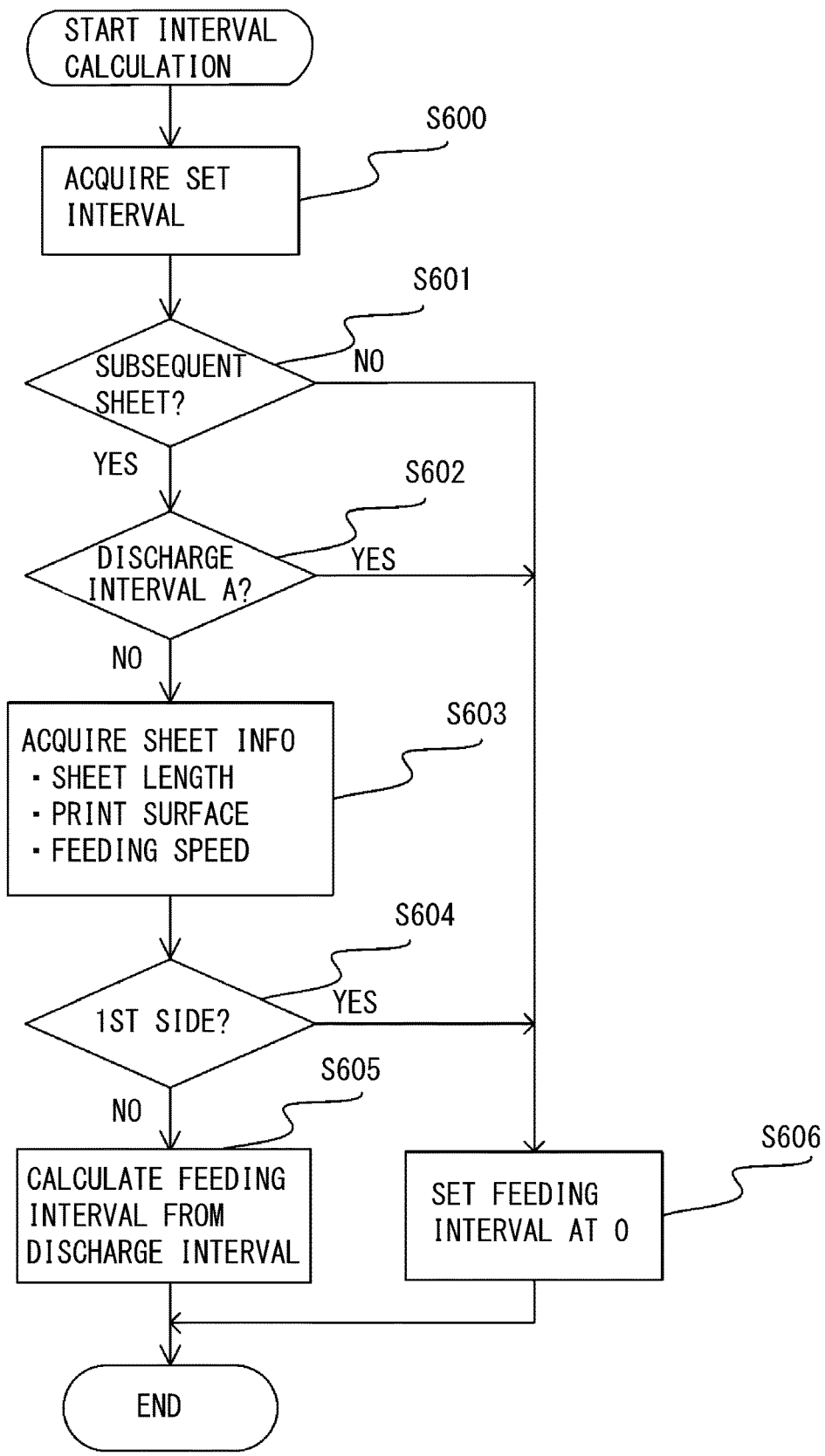

FIG. 6 is a flow chart showing a control sequence for calculating a sheet feeding interval in the embodiment 1.

Figure 7:
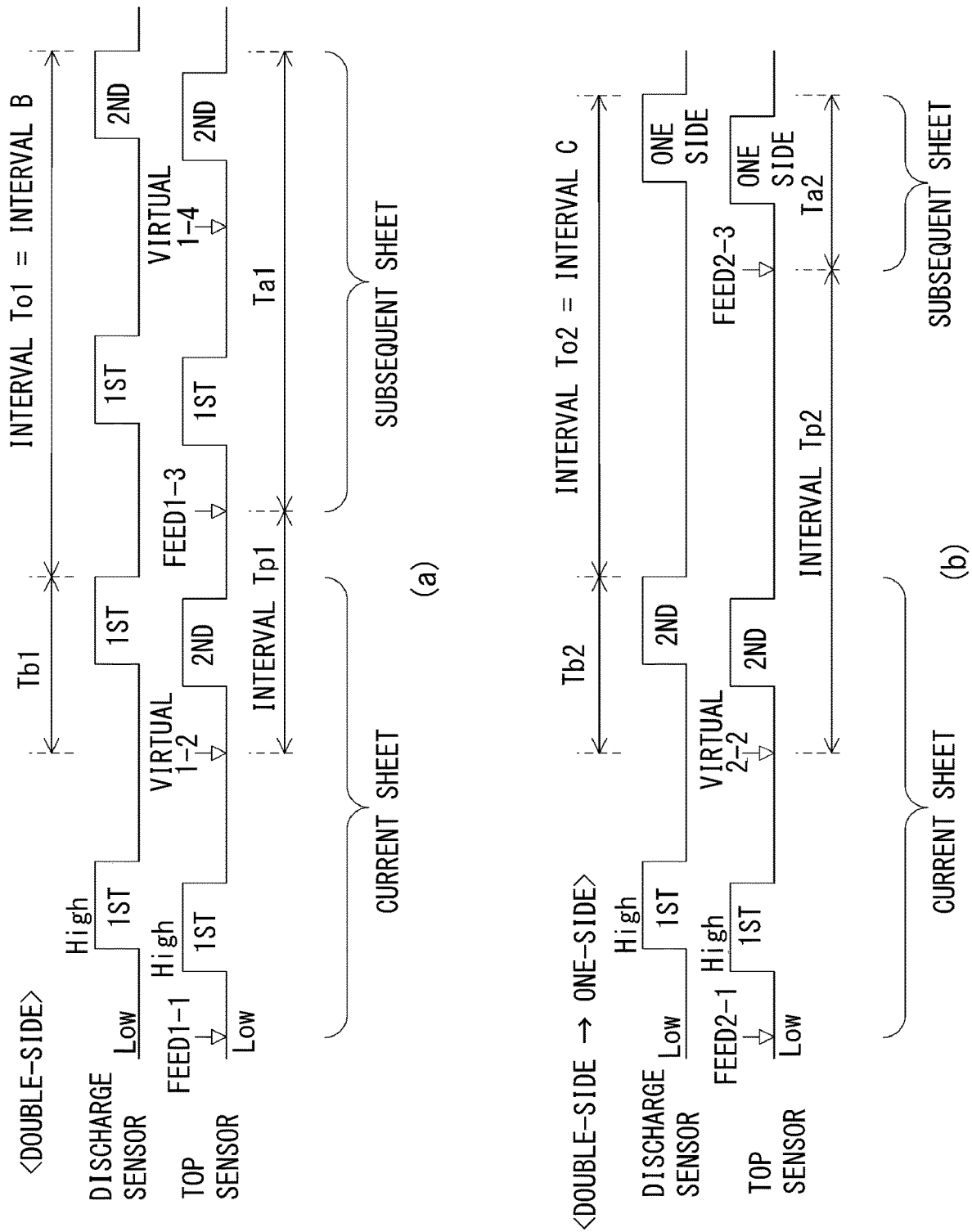

Parts (a) and (b) of FIG. 7 are timing charts each for illustrating a method of calculating the sheet feeding interval in the embodiment 1.

FIG. 8A to FIG. 8D are flow charts showing a control sequence for setting a discharge interval in the embodiment 2.

Figure 9:
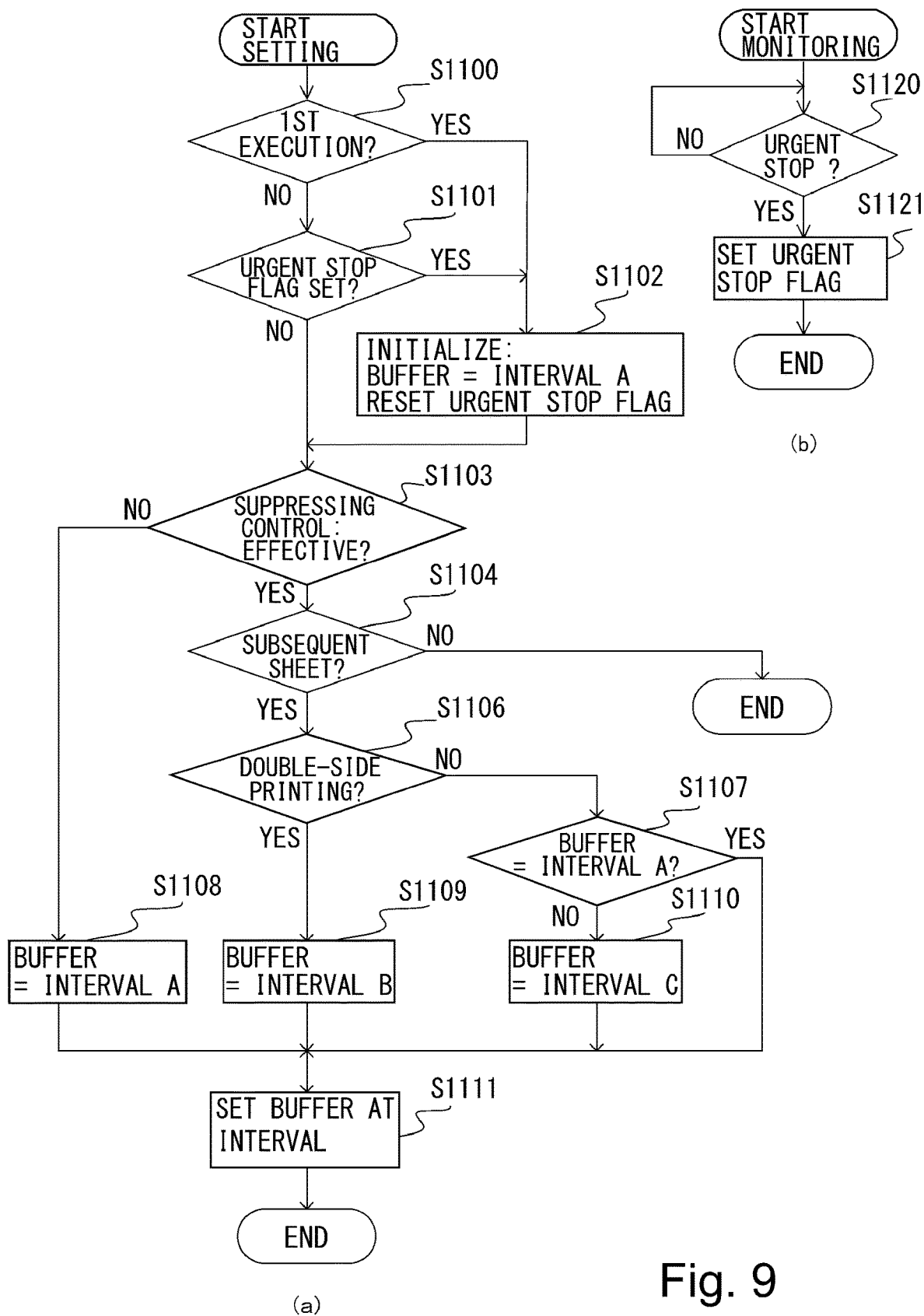

Parts (a) and (b) of FIG. 9 are flow charts showing a control sequence for setting a discharge interval in the embodiment 3.

DESCRIPTION OF THE EMBODIMENTS

In the following, embodiments of the present invention will be specifically described with reference to the drawings.

Embodiment 1

[Structure of Image Forming Apparatus]

Figure 1:
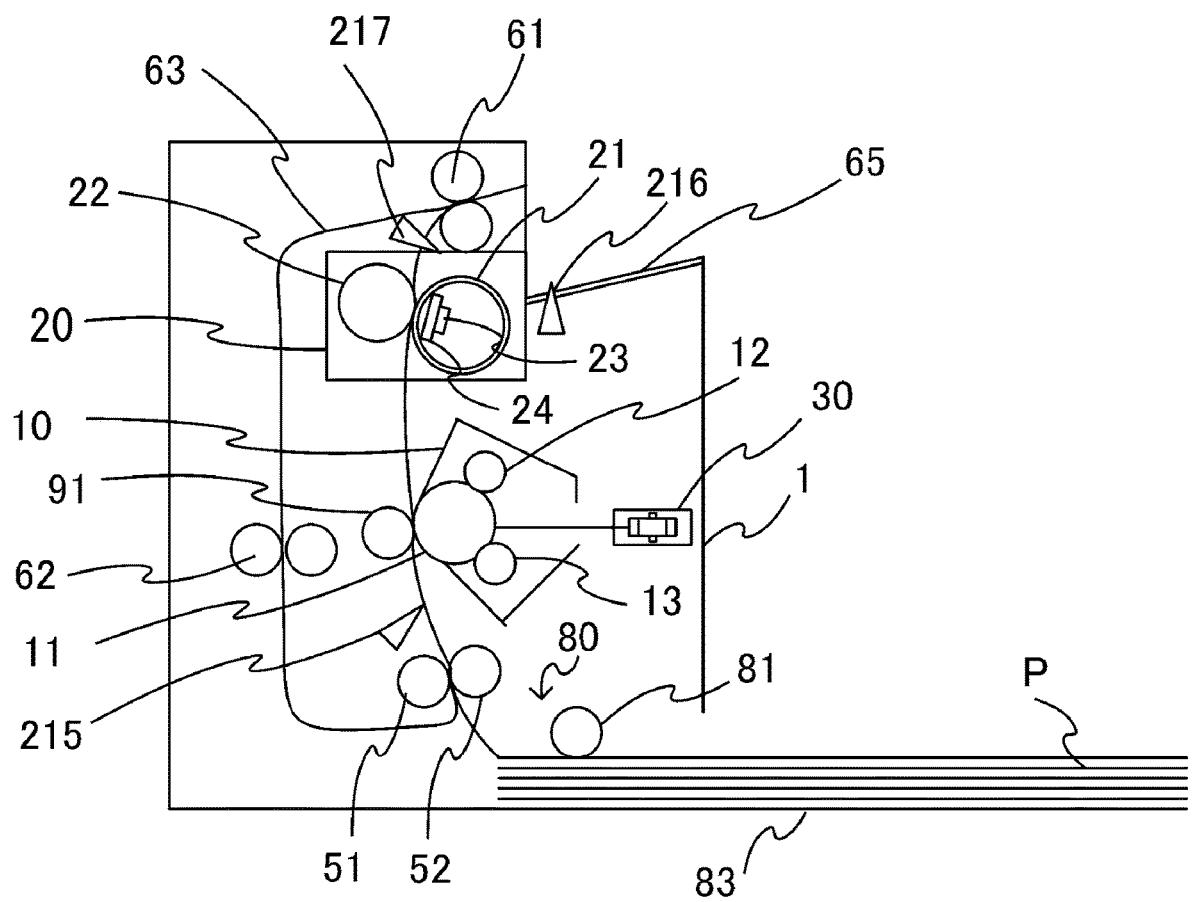
FIG. 1 is a schematic sectional view showing a structure of an image forming apparatus according to each of embodiments 1 to 3.

FIG. 1 is a schematic sectional view showing a structure of a laser beam printer 1 which is an example of an image forming apparatus to which an embodiment 1 is applied. In the printer 1, a sheet (paper) feeding portion 80 is provided on a lowest stage. The sheet feeding portion 80 includes a feeding roller 81 for feeding a sheet P which is a recording material accommodated in a feeding tray 83 which is a stacking unit. Further, in FIG. 1, at an upper-left portion of the sheet feeding portion 80, a registration roller 51 and a registration opposite roller 52 which are used for aligning and feeding a leading end position of the sheet P with respect to a (sheet) feeding direction are provided.

At a portion above the sheet feeding portion 80 in FIG. 1, a laser scanner unit 30 for forming an electrostatic latent image depending on image data by scanning a photosensitive drum 11 described later with laser light is provided. In a left direction of the laser scanner unit 30 in FIG. 1, a process cartridge 10 is provided. The process cartridge 10 which is an image forming unit includes the photosensitive drum 11, a charging roller 12, and a developing roller 13. During image formation, a surface of the photosensitive drum 11 is electrically charged to a uniform potential by the charging roller 12. Then, the surface of the photosensitive drum 11 charged to the uniform potential is scanned with the laser light by the laser scanner unit 30, whereby the electrostatic latent image depending on the image data is formed. On the electrostatic latent image formed on the photosensitive drum 11, toner is deposited by the developing roller 13, so that a toner image is formed. Then, the toner image formed on the photosensitive drum 11 is transferred onto the sheet P, fed from the sheet feeding tray 83 of the sheet feeding portion 80, by a transfer roller 91 provided at a position opposing the photosensitive drum 11. Further, a top sensor 215 detects the sheet P fed from the sheet feeding tray 83.

At a portion above the process cartridge 10 and the transfer roller 91 in FIG. 1, a fixing unit 20 for fixing the toner image on the sheet P by heating and pressing the toner image is provided. The fixing unit 20 includes a fixing film 21 for heating the toner image, and a pressing roller 22 for pressing the toner image. Further, the fixing unit 20 includes a fixing heater 24 for heating the fixing film 21, and a thermistor 23 for detecting a temperature of the fixing heater 24. At a portion right above the fixing unit 20 in FIG. 1, a discharging roller pair 61 is provided. Leftward the discharging roller pair 61 in FIG. 1, a discharge sensor 217 which is a detecting unit for detecting the sheet P passing through the fixing unit 20 is provided. A discharge tray 65 which is a discharge stacking unit on which the sheet P on which the image is formed is discharged is provided with a discharged sheet sensor 216 which is a recording material detecting unit for detecting the presence or absence of the sheet P on the discharge tray 65. On a double-side feeding passage 63 which is provided left below the discharging roller pair 61 in FIG. 1 and along which the sheet P is subjected to double-side printing, a double-side (feeding) roller pair 62 is provided.

[System Constitution]

Figure 2:
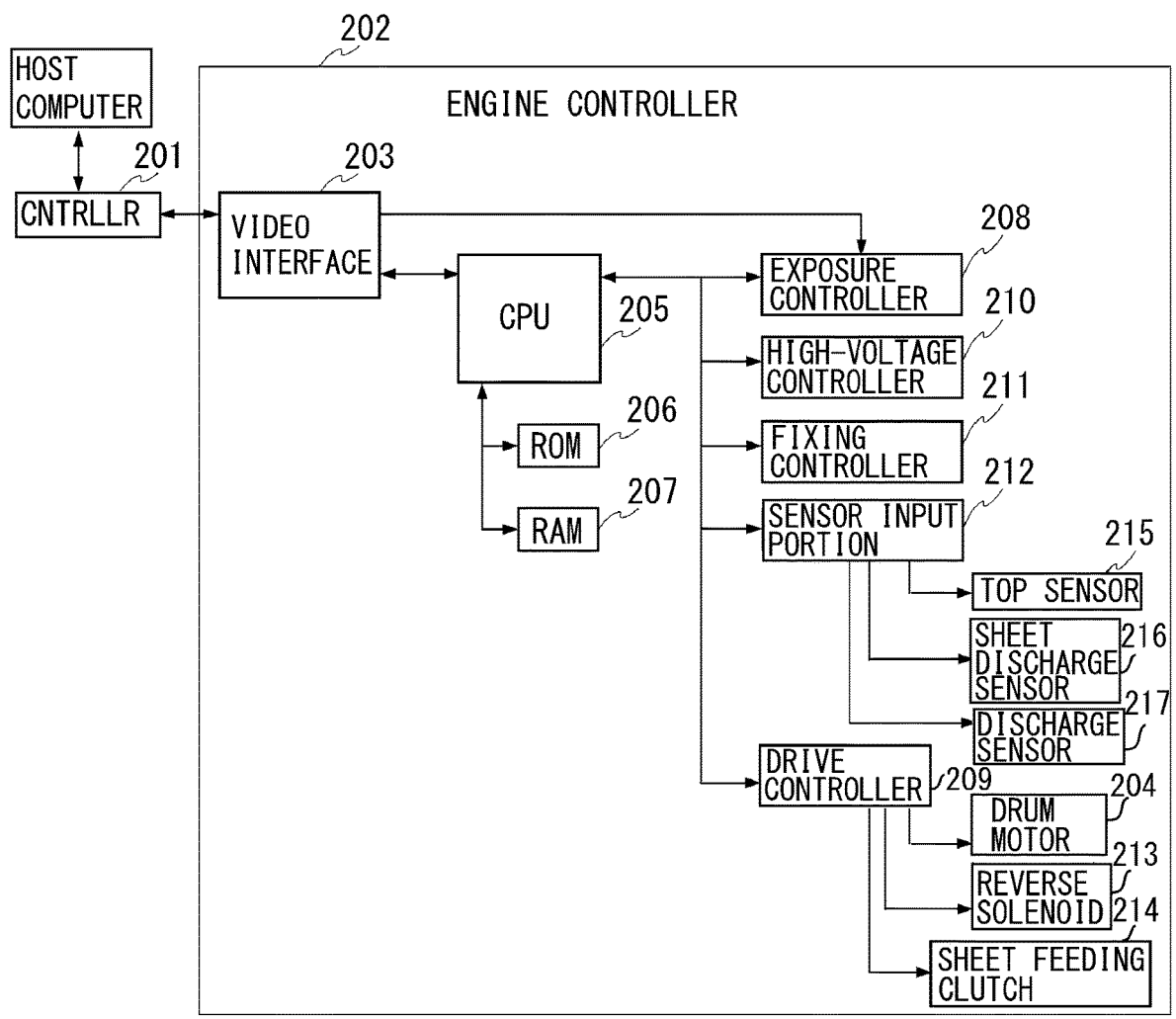
FIG. 2 is a block diagram for illustrating a control system of the image forming apparatus according to each of the embodiments 1 to 3.

FIG. 2 is a block diagram of a control system for illustrating a system constitution of the printer 1. In FIG. 2, the print 1 includes a controller portion 201 and an engine controller 202. The controller portion 201 is capable of communicating with each of a host computer 200 which is an external device and the engine controller 202. The engine controller 202 is constituted by a video interface portion 203, an exposure controller 208, a drive controller 209, a high-voltage controller 210, a fixing controller 211, a sensor input portion 212, and a CPU 205 for controlling the engine controller 202 by controlling the respective controllers. The CPU 205 is connected to a ROM 206 storing a program and data which are executed for controlling the engine controller 202 by the CPU 205 and to a RAM 207 used for temporarily storing data. Further, the CPU 205 includes a timer for measuring a time.

The host computer 200 which is the external device sends a printing condition, image data of a print image, and a print instruction to the controller portion 201 of the printer 1. The controller portion 201 not only converts the image data received from the host computer 200 into exposure data necessary for the printer 1, but also prepares print reservation information for each of the sheets on the basis of the received printing condition. The print reservation information refers to, for example, a feeding port (sheet feeding tray) indicating a supply source of the sheet, a sheet size, a sheet feeding speed, a target temperature of the fixing unit 20, and the like. The controller portion 201 sends the print reservation information to the CPU 205 via the video interface portion 203. It takes time to convert the image data into the exposure data, and therefore, the controller portion 201 sends a print preparation instruction to the CPU 205 before a process for converting the image data into the exposure data and a preparation process of the print reservation information for each sheet are completed. The CPU 205 starts a print preparatory operation when the CPU 205 receives the print preparation instruction from the controller portion 201. The controller portion 201 sends a print start instruction to the CPU 205 when the converting process from the image data into the exposure data is ended. The CPU 205 starts a printing operation (also referred to as an image forming operation) when the CPU 205 receives the print start instruction from the controller portion 201.

The drive controller 209 of the engine controller 202 rotationally drives each of rollers inside the printer 1 by a drum motor 204. Specifically, the drum motor 204 controlled by the drive controller 209 rotationally drives the feeding roller 81, the registration roller 51, the photosensitive drum 11, the transfer roller 91, the pressing roller 22, the discharging roller pair 61, and the double-side roller pair 62. The drum motor 204 and the feeding roller 81 are connected to each other via a sheet feeding clutch 214. For that reason, when the sheet P is fed from the sheet feeding tray 83, for a predetermined time, the drum motor 204 and the feeding roller 81 are connected by the sheet feeding clutch 214, so that the feeding roller 81 is rotationally driven. On the other hand, the drum motor 204 and the discharging roller pair 61 are connected to each other via a reversing solenoid 213, so that the discharging roller pair 61 can be reversely rotated. For that reason, when the double-side printing is carried out, for a predetermined time, the reversing solenoid 213 is operated, so that the drum motor 204 and the discharging roller pair 61 are connected, and thus the sheet P during discharge can be pulled into the double-side feeding passage 63.

The exposure controller 208 controls rotation of a scanner motor (not shown) and a laser light quantity of the laser scanner unit 30 depending on an instruction from the CPU 205, and controls irradiation of the photosensitive drum 11 with laser light on the basis of exposure data received from the controller portion 201. The high-voltage controller 210 controls a high-voltage source for applying a high DC voltage or a high AC voltage to the respective members in the printer 1, for example, to the charging roller 12, the developing roller 13, and the transfer roller 91. The fixing controller 211 causes the thermistor 23 to detect a surface temperature of the fixing heater 24 and controls electric power supply to the fixing heater 24 on the basis of a detection result. The sensor input portion 212 acquires pieces of detection information detected by the top sensor 215, the discharged sheet sensor 216, and the discharge sensor 217 which are used for detecting the fed sheet P, and then outputs the acquired pieces of detection information.

[Outline of Image Forming Operation]

Next, the image forming operation of the printer 1 will be described. First, in FIG. 1, a user sets sheets P in the sheet feeding tray 83. Then, when the controller portion 201 receives the print instruction from the host computer 200, the controller portion 201 sends the print preparation instruction to the CPU 205. When the CPU 205 receives the print preparation instruction from the controller portion 201, the CPU 205 starts a preparatory operation of image formation. Then, when the engine controller 202 receives the print start instruction from the controller portion 201, the engine controller 202 starts the image forming operation. When the image forming operation is started, first, the sheet P is fed by the feeding roller 81 from the sheet feeding tray 83 to between the registration roller 51 and the registration opposite roller 52. Then, the sheet P is further fed by rotation of the registration roller 51 and the registration opposite roller 52. On the other hand, in the process cartridge 10, the photosensitive drum 11 is charged to the uniform potential by the charging roller 12. Then, the surface of the photosensitive drum 11 charged to the uniform potential is scanned with the laser light from the laser scanner unit 30, whereby the electrostatic latent image depending on the image data is formed. On the electrostatic latent image formed on the photosensitive drum 11, the toner is deposited by the developing roller 13, so that the toner image is formed. Then, the toner image formed on the photosensitive drum 11 is transferred onto the sheet P in synchronism with a timing when the sheet P enters a nip between the photosensitive drum 11 and the transfer roller 91.

The toner image transferred on the sheet P is melt-fixed on the sheet P by being heated and pressed by the fixing unit 20. The sheet P on which the toner image is fixed is discharged onto the discharge tray 65 by the discharging roller pair 61, so that the image forming operation is ended.

Incidentally, in the case of the double-side printing in which the images are formed on double (both) sides (surfaces) of the sheet S, the discharging roller pair 61 is reversely rotated by the reversing solenoid 213, so that the sheet P during discharge is pulled into the double-side feeding passage 63. The sheet P pulled in the double-side feeding passage 63 is fed by the double-side roller pair 62 and is fed again to between the registration roller 51 and the registration opposite roller 52. Subsequent operations are similar to those described above for performing one-side printing of the sheet P, and therefore, will be omitted from description.

Incidentally, in a state in which there is no sheet P discharged on the discharge tray 65, when the sheet P is discharged, the discharged sheet sensor 216 detects that the sheet P is discharged on the discharge tray 65, and when the sheet P is removed from the discharge tray 65, the discharged sheet sensor 216 detects that the sheet P is absent on the discharge tray 65.

[Sheet Discharge Interval Control]

Next, control of a discharge interval of the sheet P onto the discharge tray 65 in this embodiment will be described. The control of the discharge interval of the sheet P is roughly constituted by the following four steps.

Step 1: A "discharge interval setting" procedure sets a discharge interval value of a current sheet P and a subsequent sheet P fed subsequently to the current sheet P.

Step 2: A "sheet feeding interval calculation" procedure calculates a sheet feeding interval of the subsequent sheet P (from the current sheet P) from the discharge interval value set by the "discharge interval setting" procedure.

Step 3: A "discharge interval control" procedure measures a time of the sheet feeding interval, until the subsequent sheet P is fed, calculated by the "sheet feeding interval calculation" procedure, and outputs sheet feeding permission of the subsequent sheet P.

Step 4: When the sheet feeding permission is outputted from the "discharge interval control" procedure, a "sheet feeding control" procedure performs a sheet feeding operation of the subsequent sheet P, so that the sheet P on which the image is formed with a set sheet discharge interval is discharged.

For convenience of explanation, the order of explanation of procedures (also referred to as control sequences) in the respective steps will be changed. That is, description will be made in the order of the "discharge interval setting" procedure of the step 1, the "discharge interval control" procedure of the step 3, the "sheet feeding control" procedure of the step 4, and finally the "sheet feeding interval calculation" procedure of the step 2.

In this embodiment, a discharge interval control operation will be described by taking, as an example, a print job such that double-side printing to which a first sheet P is subjected and one-side printing to which a second sheet P is subjected are carried out in mixture. Incidentally, during execution of this print job, the sheets discharged on the discharge tray 65 are not removed.

(Step 1: "Discharge Interval Setting")

First, the control sequence of the "discharge interval setting" of the step 1 will be described. In this embodiment, a discharge interval time of the sheet P in which a throughput (productivity per unit time) of the printer 1 becomes maximum when the sheet P is subjected to the one-side printing is referred to as a "discharge interval value A" (first discharge interval time). Further, a discharge interval time of the sheet P in which the above-described discharged sheet sticking phenomenon does not occur when a solid image with a largest toner application amount (density: 100%) is formed on the sheet P in a double-side printing manner is referred to as a "discharge interval value B" (second discharge interval time). Incidentally, the "discharge interval value B" is a value larger than the "discharge interval value A". Further, a discharge interval time of the sheet P satisfying a magnitude relationship of the following (formula 1) is referred to as a "discharge interval value C" (third discharge interval time).

(Discharge interval value $A$)<(Discharge interval value $B$)≤(Discharge interval value $C$)  (formula 1)

Incidentally, the discharge interval value B and the discharge interval value C are experimentally acquired in advance as times when the discharged sheet sticking phenomenon does not occur.

Figure 3:
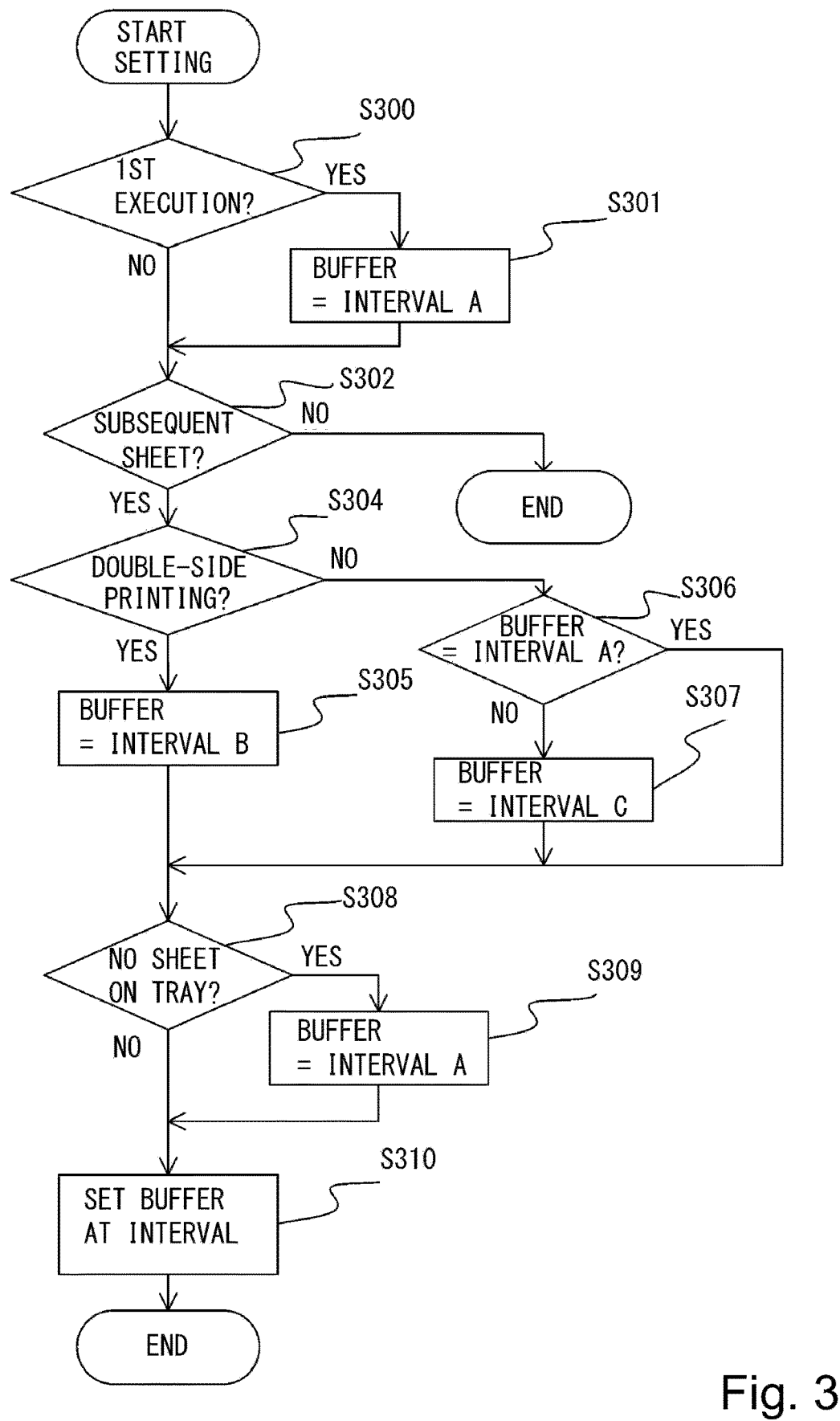
FIG. 3 is a flow chart showing a control sequence for setting a discharge interval in the embodiment 1.

FIG. 3 is a flow chart showing the control sequence of the "discharge interval setting". A process of the "discharge interval setting" is actuated by feeding a current sheet P through a sheet feeding operation in the "sheet feeding control" of the step 4 described later, and a process (sequence) shown in FIG. 3 is executed.

In step (hereinafter referred to as S) 300, the CPU 205 discriminates whether or not execution of the "discharge interval setting" is first execution after turning-on of a main switch of the printer 1, and advances the process to S301 in the case where the CPU 205 discriminated that the execution is the first execution and advances the process to S302 in the case where the CPU 205 discriminated that the execution is second execution or later execution. In S301, in order to initialize a discharge interval buffer storing the discharge interval time of the sheet P, the discharge interval value A is set as the discharge interval buffer. In this embodiment, in the case where the execution is the first execution after turning-on the main switch of the printer 1, the printed (current) sheet P is not discharged on the discharge tray 65, and therefore, the discharge interval value A which is a shortest discharge interval time is set.

In S302, the CPU 205 discriminates whether or not there is a subsequent sheet P fed subsequently to the current sheet P. In the case where the CPU 205 does not receive print reservation information on the subsequent sheet P (to be fed subsequently to the current sheet P) from the controller portion 201, the CPU 205 discriminates that there is no subsequent sheet P, and ends the process. On the other hand, in the case where the CPU 205 receives the print reservation information on the subsequent sheet P from the controller portion 201, the CPU 205 discriminates that the subsequent sheet P presents, and advances the process to S304.

In S304, the CPU 205 discriminates whether or not the subsequent sheet P is subjected to the double-side printing, on the basis of the print reservation information (print information) received from the controller portion 201. The CPU 205 advances the process to S305 in the case where the CPU 205 discriminated that the subsequent P is subjected to the double-side printing, and advances the process to S306 in the case where the CPU 205 discriminated that the subsequent sheet P is not subjected to the double-side printing (i.e., is subjected to the one-side printing). Incidentally, the process of FIG. 3 is actuated every time when the sheet P is fed. For that reason, in the case where the fed (current) sheet P is subjected to the one-side printing, the subsequent sheet P is the sheet P of the one-side printing or the sheet P of the double-side printing on which the image is formed a first side thereof. On the other hand, in the case where the fed (current) sheet P is the sheet P of the double-side printing on which the image is formed on the first side thereof, the subsequent sheet P is the same sheet P of the double-side printing on which the image is formed on a second side thereof. In the case where the fed (current) sheet P is the sheet P of the double-side printing on which the image is formed on the second side thereof, the subsequent sheet P is the sheet P of the subsequent one-side printing or the sheet P of the subsequent double-side printing on which the image is formed on the first side thereof.

In this embodiment, the print job is such that the first sheet P is subjected to the double-side printing and the second sheet P is subjected to the one-side printing, and therefore, first, a process in the case where the first sheet P on which the image is formed on the first side thereof is fed will be described. The CPU 205 advances the process to S305 in order to perform the process in the case of the double-side printing since the subsequent sheet P is the sheet P of the double-side printing on which the image is formed on the second side thereof. In S305, the CPU 205 sets the discharge interval buffer at the discharge interval value B since the subsequent sheet P is subjected to the double-side printing. In S308, the CPU 205 acquires a detection result of the discharged sheet sensor 216 via the sensor input portion 212, and discriminates the presence or absence of the sheet P discharged on the discharge tray 65, on the basis of the acquired detection result. The CPU 205 advances the process to S309 in the case where the CPU 205 discriminated that there is no sheet P discharged on the discharge tray 65, and advances the process to S310 in the case where the discharged sheet P is present on the discharge tray 65. In S309, the CPU 205 sets the discharge interval buffer at the discharge interval value A. That is, in the case where the sheet P is present on the discharge tray 65, the value set as the discharge interval buffer is the discharge interval value B, and in the case where the sheet P is removed from the discharge tray 65, the value set as the discharge interval buffer is the discharge interval value A. In S310, as a discharge interval (discharge interval time) which is a time from discharge of the current sheet P on the discharge tray 65 to discharge of the subsequent sheet P on the discharge tray 65, the CPU 205 set the value set as the discharge interval value, and ends the process.

Subsequently, the process in the case where the first sheet P of the double-side printing in which the image is formed on the second side, i.e., the process in the case where in the above-described process of S304, the CPU 205 discriminated that the subsequent sheet P is subjected to the one-side printing, will be described. In S304, the CPU 205 advances the process to S306 since the subsequent sheet P is subjected to the one-side printing. In S306, the CPU 205 discriminates whether or not the value set as the discharge interval buffer is the discharge interval value A, and advances the process to S308 in the case where the discharge interval value A is set and advances the process to S307 in the case where the discharge interval value A is not set. As described above, in the process of S303 for the first sheet of the double-side printing on which the image is formed on the first side, the discharge interval value B is set as the discharge interval buffer. Accordingly, the CPU 205 advances the process to S307 since the value of the discharge interval buffer is not the discharge interval value A. In S307, the CPU 205 sets the discharge interval buffer at the discharge interval value C. Subsequent processes are similar to those in the case of the above-described sheet P of the double-side printing on which the image is formed on the first side, as long as the sheet P is present on the discharge tray 65, the discharge interval value C is set as the discharge interval in the case where the sheet P is subjected to the one-side printing.

As described above, in the process of the "discharge interval setting", the discharge interval is set at the discharge interval value B in the case where the subsequent sheet P is subjected to the double-side printing. On the other hand, in the case where the subsequent sheet P is subjected to the one-side printing, the discharge interval is set at the discharge interval value C when the last printing carried out is the double-side printing, and is set at the discharge interval value A when only the one-side printing is carried out. Incidentally, in the case where the sheet P is removed from the discharge tray 65, even when either of the double-side printing and the one-side printing is carried out, the discharge interval is set at the discharge interval value A.

On the basis of the discharge interval set in the step 1, in the process of the "discharge interval control" of the step S3 described later, control of a sheet feeding timing of the subsequent sheet P is carried out. In the case of the double-side printing, the discharge interval of the sheet P is controlled to the discharge interval value B, and therefore, an occurrence of the above-described discharged sheet sticking phenomenon can be suppressed. Further, in the case the printing is switched from the double-side printing to the one-side printing, the discharge interval of the sheet P is set at the discharge interval value C, but the discharge interval value C is a value larger than the discharge interval value A which is the discharge interval in the case where the sheet P is not discharged on the discharge tray 65. For that reason, the throughput of the printer 1 does not become maximum, but by designing the discharge interval value C so as to be a time which is a proper discharge interval, it is possible to ensure a time necessary to cool the sheet P and the toner on the sheet P. In the case where the sheet P is removed from the discharge tray 65, the discharge interval of the sheet P is the discharge interval value A, and therefore, the throughput of the printer 1 becomes maximum.

(Step 3: "Discharge Interval Control")

Figure 4:
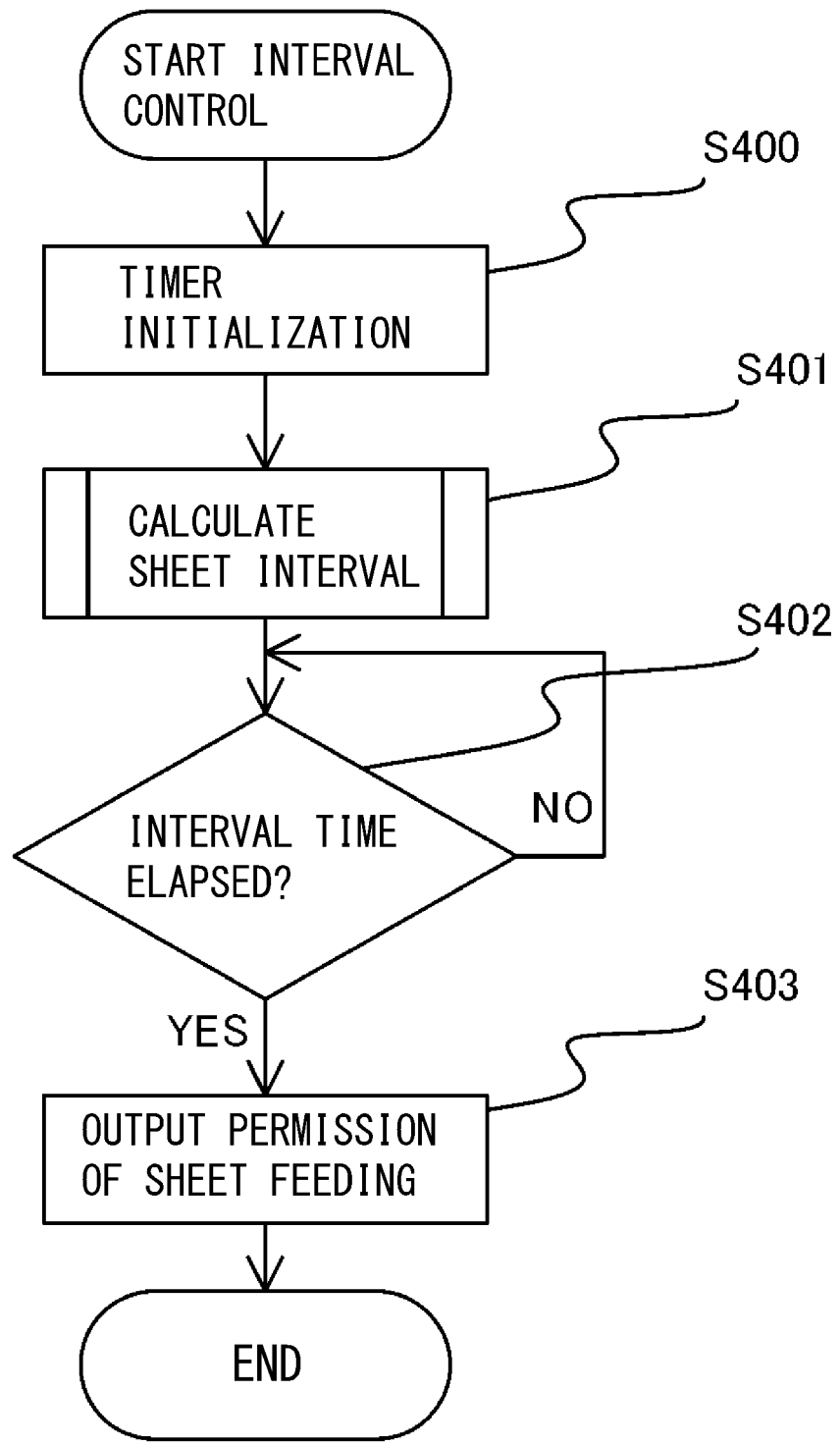
FIG. 4 is a flow chart showing a control sequence for controlling the discharge interval in the embodiment 1.

Then, a "discharge interval control" procedure will be described. FIG. 4 is a flow chart showing a control sequence of the "discharge interval control". A process of the "discharge interval control" is actuated from the "sheet feeding control" of the step 4 described later, and the process shown in FIG. 4 is executed by the CPU 205 in parallel to the "sheet feeding control".

In S400, in order to measure a sheet feeding interval time described later, the CPU 205 resets a timer and thereafter starts the timer (initialization of the timer). In S401, the CPU 205 actuates the "sheet feeding interval calculation" of the step 2 described later, and acquires the sheet feeding interval time which is a time to a feeding timing of the subsequent sheet P. In S402, the CPU 205 discriminates whether or not the sheet feeding interval time acquired in the process of S401 has elapsed by making reference to the timer, and advances the process to S403 in the case where the CPU 205 discriminated that the sheet feeding interval time has elapsed and returns the process to S402 in the case where the CPU 205 discriminated that the sheet feeding interval time has not elapsed. In S403, the CPU 205 outputs permission of sheet feeding.

(Step 4: "Sheet Feeding Control")

Next, a "sheet feeding control" procedure for actuating the process of the above-described "discharge interval setting" of the step 1 and the process of the above-described "discharge interval control" of the step 3 will be described. Part (a) of FIG. 5 is a flow chart showing a control sequence of the "sheet feeding control". The process of the "sheet feeding control" is actuated when the printer 1 starts the image forming operation, and the process shown in part (a) of FIG. 5 is executed by the CPU 205. Further, part (b) of FIG. 5 is a flow chart showing a control sequence which is actuated from the process of the "sheet feeding control" shown in part (a) of FIG. 5 and in which feeding of the sheet P from the sheet feeding tray 83 or feeding of the sheet P from the double-side feeding passage 63.

First, the process of the sheet feeding control shown in part (a) of FIG. 5 will be described. When the CPU 205 receives a print preparation instruction from the controller portion 201 before the image forming operation is started, the CPU 205 provides instructions to perform preparation for carrying out the image forming operation to the exposure controller 208, the drive controller 209, the high-voltage controller 210, and the fixing controller 211. In S500, the CPU 205 discriminates whether or not a sheet feeding preparation is completed by completion of image formation preparation in the exposure controller 208, the drive controller 209, the high-voltage controller 210, and the fixing controller 211. The CPU 205 advances the process to S501 in the case where the CPU 205 discriminated that the sheet feeding preparation is completed, and returns the process to S500 in the case where the CPU 205 discriminated that the sheet feeding preparation is not completed.

(Sheet Feeding Operation)

In S501, the CPU 205 actuates the sheet feeding operation shown in part (b) of FIG. 5 in order to carry out the feeding of the sheet P. Here, the process of the "sheet feeding operation" shown in part (b) of FIG. 5 will be described. The sheet feeding operation in this embodiment includes two sheet feeding operations for feeding the sheet P from the sheet feeding tray 83 and for feeding the sheet P from the double-side feeding passage 63. In a print job of this embodiment, the first sheet P is subjected to the double-side printing, and therefore, when the image is formed on one side (first side) of the first sheet P, the first sheet P is fed to the double-side feeding passage 63, but in the double-side feeding passage 63, feeding of the first sheet P cannot be stopped. That is, as described above, in order to feed the sheet P to the double-side feeding passage 63, when the reversing solenoid 213 is controlled, the sheet P is fed along the double-side feeding passage 63 and then is fed to between the registration roller 51 and the registration opposite roller 52 after a predetermined time. For this reason, in this embodiment, in the case where the image is formed on a second side, an image forming sequence may only be required to be started at a predetermined timing (hereinafter, the sheet feeding operation of the sheet P during the double-side printing in which the image is formed on the second side is referred to as "virtual sheet feeding"). In FIG. 1, a distance of a feeding passage along which the sheet P is fed from the feeding roller 81 to between the registration roller 51 and the registration opposite roller 52 is referred to as a distance L. Then, a position on the feeding passage along which the virtual sheet feeding is carried out is a position upstream of between the registration roller 51 and the registration opposite roller 52 by the distance L on the double-side feeding passage 63. A difference between a normal sheet feeding operation from the sheet feeding tray 83 and the above-described virtual sheet feeding is whether or not the sheet feeding clutch 214 for connecting the drum motor 204 and the feeding roller 81 in order to drive the sheet feeding roller 81 for feeding the sheet P is controlled.

Subsequently, respective processes shown in part (b) of FIG. 5 will be described. In S510, the CPU 205 discriminates whether or not a current print side (surface) is the second side (surface) in the double-side printing on the basis of the print reservation information received from the controller portion 201. The CPU 205 advances the process to S512 in the case where the CPU 205 discriminated that the current side is the second side in the double-side printing, and advances the process to S511 in the case where the CPU 205 discriminated that the current side is not the second side in the double-side printing. In S511, in order to feed the sheet P from the sheet feeding tray 83, the CPU 205 controls the sheet feeding clutch 214 and thus drives the feeding roller 81 through connection between the drum motor 204 and the feeding roller 81, so that the sheet P is fed from the sheet feeding tray 83. In S512, the CPU 205 controls the exposure controller 208, the drive controller 209, the high-voltage controller 210, and the fixing controller 211, and thus starts the image forming operation, and then end the process. Incidentally, an outline of the image forming operation is as described above, and description of the detailed control sequence of the image forming operation will be omitted in this embodiment.

When the process of the sheet feeding operation of S501 is ended, in S502, the CPU 205 actuates the above-described process of the "discharge interval setting" of the step 1, and acquires a discharge interval time between the (current) sheet P fed in S501 and the subsequent sheet P. In S503, the CPU 205 actuates the "discharge interval control" process of the above-described step 3 in order to control the discharge interval of the sheet P.

In S504, the CPU 205 makes reference to the timer, and discriminates whether or not a minimum waiting time until the feeding of the subsequent sheet P is started has elapsed. The waiting time in this case is a waiting time ((sheet interval+sheet length) time) acquired by dividing the sum of a sheet interval distance and a sheet length, which are determined in advance, by a feeding speed, and is a waiting time for preventing collision of the subsequent sheet P with the (current) sheet P fed in S501 even when the subsequent sheet P is fed subsequently to the (current) sheet P. The CPU 205 advances the process to S505 in the case where the CPU 205 discriminated that the waiting time has elapsed by making reference to the timer, and returns the process to S504 in the case where the CPU 205 discriminated that the waiting time has not elapsed. Incidentally, the above-described waiting time changes depending on whether the printing is the double-side printing or the one-side printing, but setting of the time is a general matter and is not a characteristic portion of the present invention, and therefore, will be omitted from description.

Next, in S505, the CPU 205 discriminates, from the "discharge interval control" process shown in FIG. 4, whether or not permission of the sheet feeding of the subsequent sheet P is outputted. The CPU 205 advances the process to S506 in the case where the CPU 205 discriminated that the permission of the sheet feeding is outputted, and returns the process to S505 in the case where the CPU 205 discriminated that the permission of the sheet feeding is not outputted. In S506, the CPU 205 discriminates whether or not the print job is ended, and the CPU 205 returns the process to S501 in the case where the CPU 205 discriminated that the print job is not ended, and ends the process of the sheet feeding control in the case where the CPU 205 discriminated that the print job is ended.

(Step 2: "Sheet Feeding Interval Calculation")

Finally, the "sheet feeding interval calculation" procedure of the step 2 will be described. FIG. 6 is a flow chart showing a control sequence of the "sheet feeding interval calculation". The process of the "sheet feeding interval calculation" is actuated form the above-described "discharge interval control" of the step 3, and the process shown in FIG. 6 is executed.

In S600, the CPU 205 acquires the discharge interval value (discharge interval time) set in the "discharge interval setting" of the above-described step 1. In S601, the CPU 205 discriminates whether or not the subsequent sheet is present. The CPU 205 advances the process to S602 in the case where the subsequent sheet is present, and advances the process to S606 in the case where the subsequent sheet is not present. In S602, the CPU 205 discriminates whether or not the acquired discharge interval (discharge interval time) is the discharge interval value A. The CPU 205 advances the process to S606 since there is no need to calculate the sheet feeding interval in the case where the CPU 205 discriminated that the discharge interval is the discharge interval value A, and advances the process to S603 in the case where the CPU 205 discriminated that the discharge interval is not the discharge interval value A.

In S603, on the basis of the print reservation information received from the controller portion 201, the CPU 205 acquires necessary information for calculating a sheet feeding interval between the current sheet P and the subsequent sheet P. Here, the necessary information refers to sheet length information of the current sheet P and the subsequent sheet P, print side information as to whether the current sheet P and the subsequent sheet P are subjected to the one-side printing or to the double-side printing in which the images are formed on the first side and the second side, respectively, and a feeding speed of the sheets P. Incidentally, in this embodiment, the above-described pieces of information are not acquired by being limited to the print reservation information. For example, as regards the sheet length information, in the case where a sensor capable of detecting a sheet length of the sheets accommodated in the sheet feeding tray 83 is mounted, a detection value of the sensor, not the print reservation information sent from the controller portion 201, may also be used. Further, a sheet length information calculated by multiplying a detection time by a feeding speed of the sheet P on the basis of a time in which the sheet P is detected by the above-described top sensor 215 may also be used.

In S604, the CPU 205 discriminates whether or not the print side of the fed (current) sheet P is a first side of the sheet P in the double-side printing on the basis of the print reservation information sent from the controller portion 201. The CPU 205 advances the process to S606 in the case where the CPU 205 discriminated that the print side of the fed sheet P is the first side of the sheet P in the double-side printing, and advances the process to S605 in the case where the CPU 205 discriminated that the print side of the fed sheet P is not the first side of the sheet P in the double-side printing (one side in the one-side printing or the second side of the sheet P in the double-side printing). In S605, the CPU 205 calculates the sheet feeding interval of the subsequent sheet P from the discharge interval value (discharge interval time) acquired in S600, and ends the process. In S606, the CPU 205 sets the sheet feeding interval at 0, and ends the process. As described above, calculation of the sheet feeding interval of the subsequent sheet P is carried out when the current sheet P is subjected to the one-side printing or to the double-side printing in which the image is formed on the second side of the current sheet P, and is not carried out when the current sheet P is subjected to the double-side printing in which the image is formed on the first side or is a final sheet to which no sheet P is subsequent.

Here, a specific calculating method of the sheet feeding interval in S605 will be described using timing charts of parts (a) and (b) of FIG. 7. Part (a) of FIG. 7 shows the timing chart in the case where both the current sheet P fed earlier and the subsequent sheet P fed subsequently to the current sheet P are subjected to the double-side printing, and part (b) of FIG. 7 shows the timing chart in the case where the current sheet is subjected to the double-side printing and the subsequent sheet is subjected to the one-side printing. In parts (a) and (b) of FIG. 7, the top sensor and the discharged sensor show the detection states of the top sensor 215 and the discharge sensor 217, respectively, shown in FIG. 1, in which "High" shows a state in which the sheet P is detected, and "Low" shows a state in which the sheet P is not detected. Further, in parts (a) and (b) of FIG. 7, "1ST" represents that the print side is the first side in the double-side printing, and "2ND" represents that the print side is the second side in the double-side printing. Further, "ONE SIDE" represents that the printing is the one-side printing. Further, "FEED" represents that the sheet P is fed from the sheet feeding tray 83, and "VIRTUAL" represents that the sheet P is fed from the double-side feeding passage 63 as described above.

First, a calculating method, shown in part (a) of FIG. 7, of a sheet feeding interval $Tp1$ from virtual sheet feeding of the current sheet to sheet feeding of the subsequent sheet when both the current sheet and the subsequent sheet are subjected to the double-side printing will be described. In this case, the sheet feeding interval $Tp1$ such that a discharge interval $To1$ which is a time from passing of the current sheet through the discharge sensor 217 to passing of the subsequent sheet through the discharge sensor 217 becomes the discharge interval value B set in the "discharge interval setting" procedure in the above-described step 1 is calculated. Here, the discharge interval $To1$ is a time from the passing of the current sheet through the discharge sensor 217 after the image is formed on the second side of the current sheet in the double-side printing is ended to the passing of the subsequent sheet through the discharge sensor 217 after the image is formed on the second side of the subsequent sheet in the double-side printing is ended. Further, the sheet feeding interval $Tp1$ is a time from virtual sheet feeding 1-2 of the current sheet in the double-side printing in which the image is formed on the second side of the current sheet to sheet feeding 1-3 of the subsequent sheet. Here, a time from the virtual sheet feeding 1-2 of the current sheet to passing of the current sheet through the discharge sensor 217 is a time $Tb1$, and a time from the sheet feeding 1-3 to passing of the subsequent sheet through the discharge sensor 217 after printing of the image on the second side of the subsequent sheet in the double-side printing is ended is $Ta1$. Then, the sheet feeding interval $Tp1$ can be acquired by the following (formula 2).

$$\text{Sheet feeding interval } Tp1 = (\text{discharge interval } To1) + (\text{time } Tb1) - (\text{time } Ta1) = (\text{discharge interval value } B) + (\text{time } Tb1) - (\text{time } Ta1) \quad \text{(formula 2)}$$

Here, the time $Tb1$ can be calculated by the following (formula 3) by acquiring a feeding distance from a virtual sheet feeding (1-2) position to the discharge sensor 217, a sheet length of the current sheet, and feeding speed information of the current sheet.

$$\text{Time } Tb1 = ((\text{feeding distance from virtual sheet feeding position to discharge sensor 217}) + (\text{sheet length}))/(\text{feeding speed}) \quad \text{(formula 3)}$$

Further, the time $Ta1$ can be calculated using the following (formula 4) by a feeding distance of the subsequent sheet from the feeding roller 81 to a reversal start position, a feeding distance of the subsequent sheet from the reversal start position to the discharge sensor 217 through the double-side feeding passage 63, a sheet length of the subsequent sheet, and feeding speed information of the subsequent sheet.

$$\text{Time } Ta1 = ((\text{feeding distance from feeding roller 81 to reversal start position}) + (\text{feeding distance from reversal start position to discharge sensor 217}) + (\text{sheet length} \times 2))/(\text{feeding speed}) \quad \text{(formula 4)}$$

Next, a calculating method, shown in part (b) of FIG. 7, of a sheet feeding interval $Tp1$ from virtual sheet feeding of the current sheet to sheet feeding of the subsequent sheet when the current sheet is subjected to the double-side printing and the subsequent sheet are subjected to the one-side printing will be described. In this case, the sheet feeding interval Tp2 such that a discharge interval To2 which is a time from passing of the current sheet through the discharge sensor 217 to passing of the subsequent sheet through the discharge sensor 217 becomes the discharge interval value C set in the "discharge interval setting" procedure in the above-described step 1 is calculated. Here, the discharge interval To2 is a time from the passing of the current sheet through the discharge sensor 217 after the image is formed on the second side of the current sheet in the double-side printing is ended to the passing of the subsequent sheet through the discharge sensor 217 after the one-side printing of the image on the subsequent sheet is ended. Further, the sheet feeding interval Tp2 is a time from virtual sheet feeding 2-2 of the current sheet in the double-side printing in which the image is formed on the second side of the current sheet to sheet feeding 2-3 of the subsequent sheet. Here, when a time from the virtual sheet feeding 2-2 of the current sheet to passing of the current sheet through the discharge sensor 217 is a time Tb2, and a time from the sheet feeding 2-3 to passing of the subsequent sheet through the discharge sensor 217 is Ta2, the sheet feeding interval Tp2 can be acquired by the following (formula 5).

Sheet feeding interval $Tp2$=(discharge interval $To2$)+ (time $Tb2$)−(time $Ta2$)=(discharge interval value $C$)+(time $Tb2$)−(time $Ta2$)  (formula 5)

Here, the calculating method of the time Tb2 is the same as the calculating method of the above-described time Tb1, and therefore, will be omitted from description.

Further, the time Ta2 can be calculated using the following (formula 6) by a feeding distance of the subsequent sheet from the feeding roller 81 to the discharge sensor 217, a sheet length of the subsequent sheet, and feeding speed information of the subsequent sheet.

Time $Ta2$=((feeding distance from feeding roller 81 to discharge sensor 217)+(sheet length))/(feeding speed)  (formula 6)

By the above-described method, the sheet feeding interval can be calculated from the discharge interval value.

As described above, in the print job in which the double-side printing and the one-side printing are carried out in mixture, even when the printing is switched from the double-side printing to the one-side printing, the discharge interval time of the sheet P can be controlled to a time which is longer than the discharge interval time of the sheet P during the one-side printing and which is equal to or shorter than the discharge interval time of the sheet P during the double-side printing. As a result, the occurrence of the above-described discharged sheet sticking phenomenon can be suppressed.

As described above, according to this embodiment, it is possible to suppress the occurrence of the discharged sheet sticking phenomenon on the discharge tray.

Embodiment 2

In the embodiment 1, a method in which the occurrence of the discharged sheet sticking phenomenon is suppressed by calculating the discharge interval by using the discharge interval value B and the discharge interval value C which are experimentally acquired in advance was described. In an embodiment 2, a method in which productivity is further improved by using print ratio information of the sheet during the image formation will be described. Further, in the embodiment 1, an example in which the printer is provided with the discharged sheet sensor for detecting the presence or absence of the sheet on the discharge tray 65 was described. In this embodiment, a method in the case where the printer is not provided with the discharged sheet sensor will be described.

Incidentally, as described above, the printer 1 of this embodiment is similar to the printer 1 shown in FIG. 1 of the embodiment 1 except that the discharged sheet sensor 216 is not provided, so that description will be omitted by using the same reference numerals or symbols for the same constituent elements. Further, also as regards a constitution of a control system of the printer 1 of this embodiment, the same constitution is employed except that the discharged sheet sensor 216 is not provided in the block diagram shown in FIG. 2 of the embodiment 1.

Further, in this embodiment, the CPU 205 of the engine controller 202 receives the print start instruction and the print ratio information from the controller portion 201, and the controller portion 201 sends the print ratio information to the CPU 205 every side of the sheet P. Incidentally, a print ratio (unit: %) is a numerical value obtained by dividing the number of pixels formed on the sheet P by the laser light emitted from the laser scanner unit 30 by the number of all the pixels and then by multiplying a resultant value by 100.

[Discharge Interval Control of Sheet]

In this embodiment, a method of discharge interval control of the sheet will be described using a print job in which a first sheet is subjected to the one-side printing, a second sheet is subjected to the double-side printing, and a third sheet is subjected to the one-side printing again and thus the one-side printing and the double-side printing are performed in mixture will be described. Further, in this embodiment, also, discharge interval control of the sheet P in the case where an intermittent printing operation such that a print job for performing the one-side printing is executed after the above-described print job is ended will be described in combination.

The discharge interval control of the sheet P in this embodiment include four steps from a step 1 to a step 4 similarly as in the case of the embodiment 1, but in this embodiment, only the "discharge interval setting" procedure of the step 1 is different from the "discharge interval setting" procedure of the step 1 in the embodiment 1. The processes of other steps, i.e., the "discharge interval calculation" of the step 2, the "discharge interval control" of the step 3, and the "sheet feeding control" of the step 4 are similar to the processes described in the embodiment 1 and will be omitted from the description in this embodiment.

Further, in this embodiment, the "discharge interval value B" and the "discharge interval value C" which were the times determined in advance in the embodiment 1 are capable of being changed on the basis of the print ratio information. A table 1 is a table in which the "discharge interval value B" and the "discharge interval value C" which correspond to the print ratio (unit: %) are summarized. In the table 1, as the print ratio, 0%, 40%, 60%, and 100% are cited. As the discharge interval value B (unit: msec), the discharge interval values B of B0, B40, B60, and B100 when the print ratio is 0%, 40%, 60%, and 100%, respectively, are cited. Further, similarly in the table 1, as the discharge interval value C (unit: msec), the discharge interval values C of B0-T, B40-T, B60-T, and B100-T when the print ratio is 0%, 40%, 60%, and 100%, respectively, are cited. Here, the discharge interval values B of B0, B40, B60, and B100 satisfy a relationship of the following (formula 7). Further, a time T is a value of 0 or more and satisfies a relationship of the following (formula 8). Further, the time B100 and the time B100-T are times equal to the discharge interval value B and the discharge interval value C, respectively, in the embodiment 1.

$$\text{Discharge interval value } A<B0<B40<B60<B100 \quad \text{(formula 7)}$$

$$\text{Discharge interval value } A<B0\text{-}T<B40\text{-}T<B60\text{-}T<B100\text{-}T \quad \text{(formula 8)}$$

TABLE 1

| | PRINT RATIO (%) | | | | | | |
|---|---|---|---|---|---|---|---|
| | 0 | ... | 40 | ... | 60 | ... | 100 |
| DIV*[1] B | B0 | ... | B40 | ... | B60 | ... | B100 |
| DIV*[1] C | B0-T | ... | B40-T | ... | B60-T | ... | B100-T |

*[1]"DIV" is the discharge interval value [msec].

Incidentally, data of the table 1 are stored in the ROM 206 of the engine controller 202.

Figure 8A:
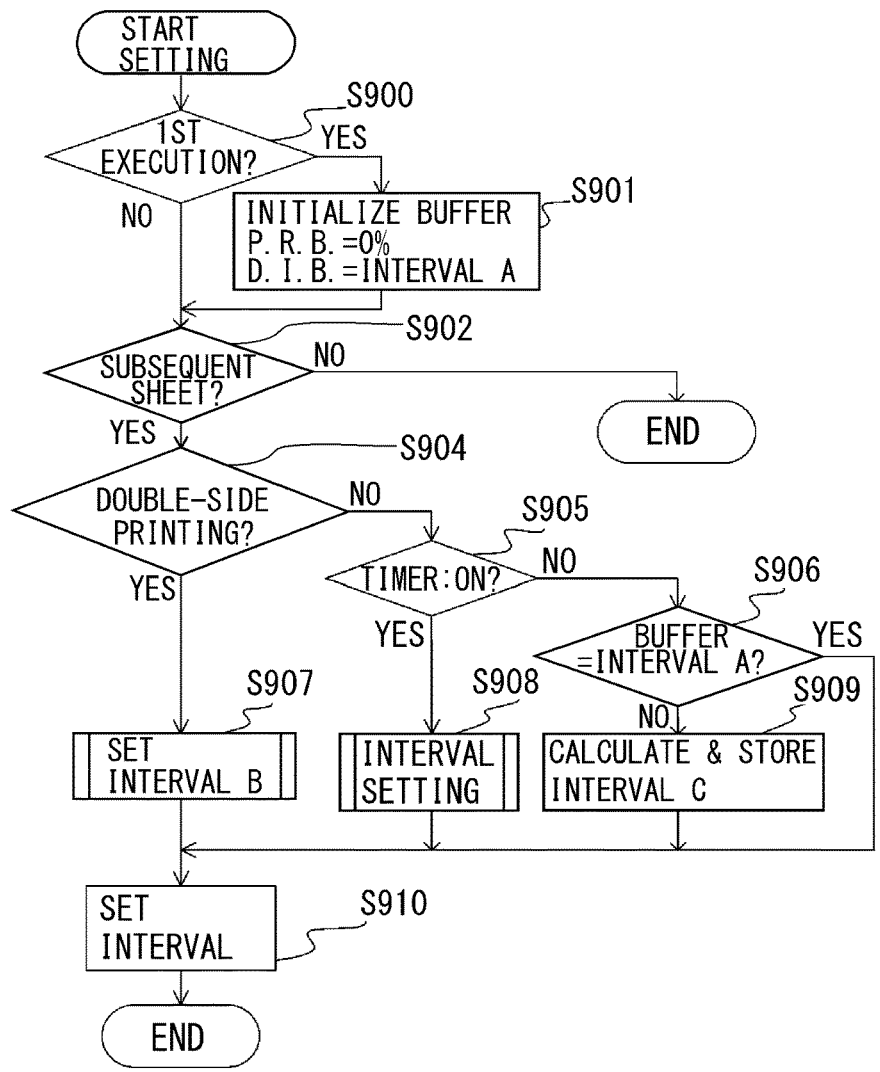
Figure 8B:
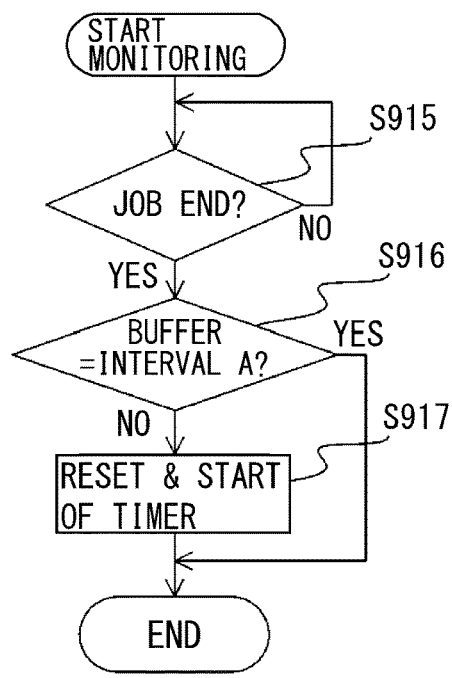
Figure 8C:
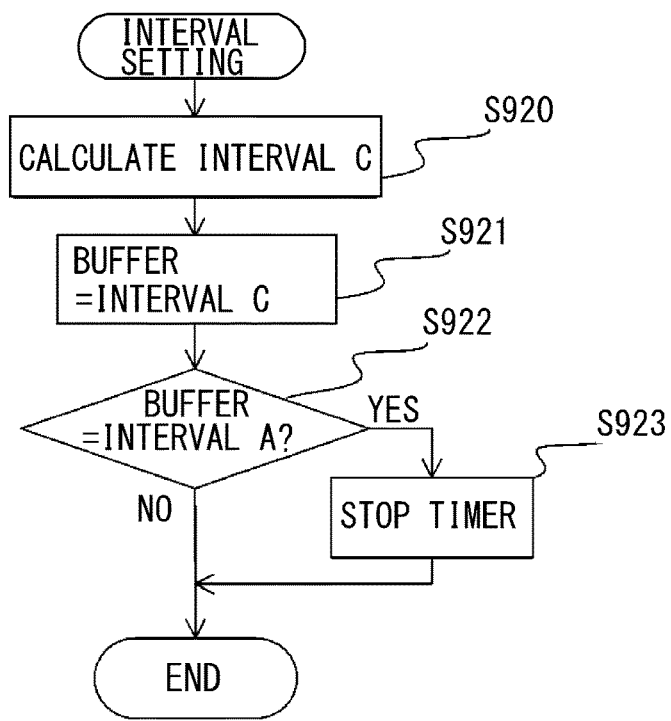
Figure 8D:
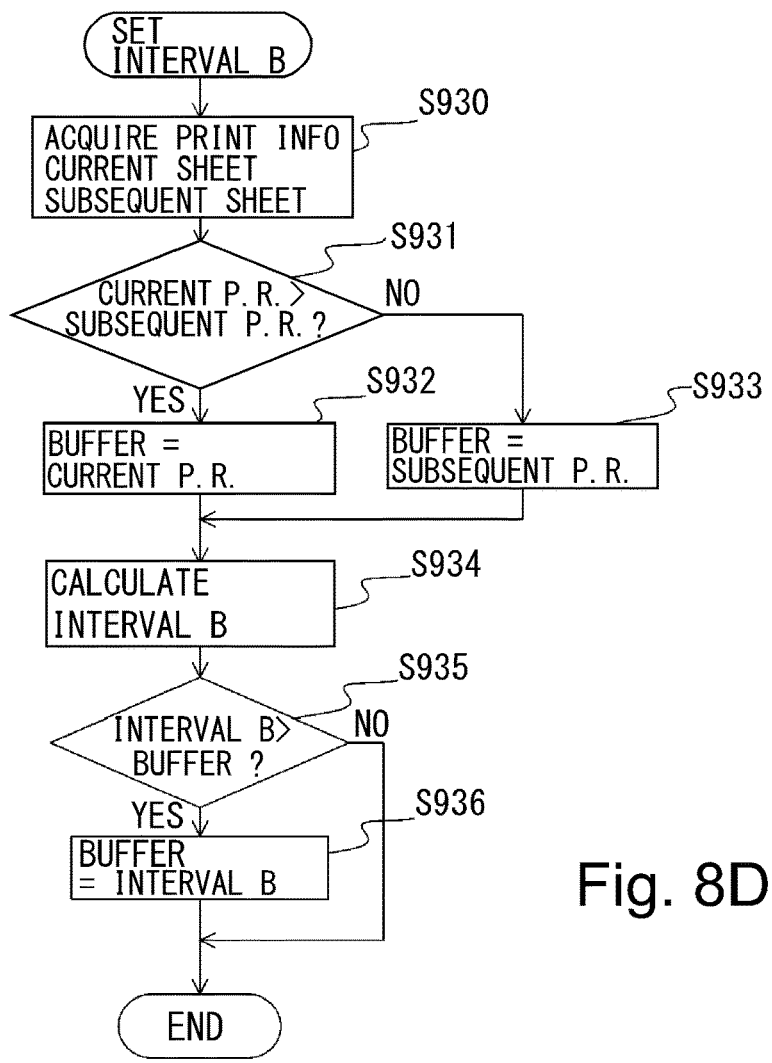

FIG. 8A shows a flow chart showing a control sequence of the "discharge interval setting" in this embodiment. The process of the "discharge interval setting" is actuated from the "sheet feeding control" (part (a) of FIG. 5) of the step 4 similarly as in the embodiment 1, and the process shown in FIG. 8A is executed by the CPU 205. FIG. 8B shows a flow chart showing a control sequence of a "job end monitoring" for monitoring an end of the print job. In this embodiment, after the print job is ended, the discharge interval control of the sheet P in the case of the intermittent printing operation executing the print job is carried out again. For that reason, the "job end monitoring" shown in FIG. 8B is also actuated simultaneously with a start of the image forming operation by the printer 1, and the process is executed by the CPU 205. FIG. 8C is a flow chart showing a control sequence of "discharge interval setting during intermittent printing" in which a discharge interval of the sheet P during the intermittent printing is set. The process of FIG. 8C is actuated from FIG. 8A, and the process is carried out by the CPU 205. FIG. 8D is a flow chart showing a control sequence of "setting of discharge interval value B". The process of FIG. 8D is actuated from FIG. 8A, and the process is carried out by the CPU 205.

[Job End Monitoring]

In this embodiment, in the case of the intermittent printing in which the print job is executed again after the end of the print job, depending on an b time elapsed from the end of the last print job, the discharge interval control of the sheet P in a subsequent print job executed subsequently to the last print job is carried out. For that reason, the job end monitoring process shown in FIG. 8B is also actuated simultaneously that the process of part (a) of FIG. 5 of the embodiment 1 is actuated and the printer 1 starts the image forming operation.

In S915, the CPU 205 discriminates whether or not the print job during current execution is ended, and advances the process to S916 in the case where the CPU 205 discriminated that the print job is ended and returns the process to S915 in the case where the CPU 205 discriminated that the print job is not ended.

In S916, the CPU 205 discriminates whether or not the discharge interval value set as a discharge interval buffer in which the discharge interval time is set in the process of FIG. 8A described later is equal to the discharge interval value A. The CPU ends the process in the case where the CPU 205 discriminated that the discharge interval value set as the discharge interval buffer equals to the discharge interval value A and advances the process to S917 in the case where the CPU 205 discriminated that the discharge interval value set as the discharge interval buffer does not equal to the discharge interval value A.

In S917, the CPU 205 resets a timer and the starts the timer for measuring an elapsed time from the end of the print job, and ends the process.

[Step 1: "Discharge Interval Setting"]

In order to execute the print job in this embodiment, the process of part (a) of FIG. 5 is actuated, and one-side printing of the image on the first sheet P is started. Then, when S502 (discharge interval setting) of part (a) is executed, the process of "discharge interval setting" of FIG. 8A is actuated.

(Printing (One-Side Printing) of Image on First Sheet P)

In S900, the CPU 205 discriminates whether or not execution of the "discharge interval setting" is first execution after turning-on of a main switch of the printer 1, and advances the process to S901 in the case where the CPU 205 discriminated that the execution is the first execution and advances the process to S902 in the case where the CPU 205 discriminated that the execution is second execution or later execution. In S901, in order to initialize a discharge interval buffer storing a print ratio of a print side of the sheet P and the discharge interval time of the sheet P, 0 (%) is set as a print ratio buffer, and the discharge interval value A is set as the discharge interval buffer. In this embodiment, in the case where the execution is the first execution after turning-on the main switch of the printer 1, the printed (current) sheet P is not discharged on the discharge tray 65, and therefore, the discharge interval value A which is a shortest discharge interval time is set. In this case, the first execution after turning-on of the main switch of the printer 1 is made by the print in this embodiment.

In S902, the CPU 205 discriminates whether or not there is a subsequent sheet P fed subsequently to the current sheet P. In the case where the CPU 205 does not receive print reservation information on the subsequent sheet P (to be fed subsequently to the current sheet P) from the controller portion 201, the CPU 205 discriminates that there is no subsequent sheet P, and ends the process. On the other hand, in the case where the CPU 205 receives the print reservation information on the subsequent sheet P from the controller portion 201, the CPU 205 discriminates that the subsequent sheet P presents, and advances the process to S904. In this case, the CPU 205 receives the print reservation information on the subsequent sheet P from the controller portion 201, and thus advances the process to S904.

In S904, the CPU 205 discriminates whether or not the subsequent sheet P is subjected to the double-side printing, on the basis of the print reservation information (print information) received from the controller portion 201. The CPU 205 advances the process to S907 in the case where the CPU 205 discriminated that the subsequent P is subjected to the double-side printing, and advances the process to S905 in the case where the CPU 205 discriminated that the subsequent sheet P is not subjected to the double-side printing (i.e., is subjected to the one-side printing). In the case of this embodiment, the subsequent sheet is subjected to the double-side printing, so that the CPU 205 advances the process to S907.

In S907, the CPU 205 actuates the process of "setting of discharge interval value B" shown in FIG. 8D in order to make setting of the discharge interval value B.

(Setting of Discharge Interval Value B)

Subsequently, the process of "setting of device B" of FIG. 8D will be described. In S930, the CPU 205 acquires the print ratio information, on the print side (in the one-side printing in this case) of the fed (current) sheet P, sent by the controller portion 201, and acquires the print ratio information on the print side (in the double-side printing in this case) of the subsequent sheet P.

In S931, the CPU 205 discriminates whether or not the print ratio of the print side of the current sheet P is larger than the print ratio of the print side of the subsequent sheet P (print ratio of current sheet print side)>(print ratio of subsequent print side)?). The CPU 205 advances the process to S932 in the case where the CPU 205 discriminated that the print ratio information on the print side of the current sheet P is larger than the print ratio information on the print side of the subsequent sheet P. On the other hand, the CPU 205 advances the process to S933 in the case where the CPU 205 discriminated that the print ratio information on the print side of the current sheet P not more than the print ratio information on the print side of the subsequent sheet P. In S932, the CPU 205 sets the print ratio of the print side of the current sheet P as the print ratio buffer. In S933, the CPU 205 sets the print ratio of the print side of the current sheet P as the print ratio buffer. In the process of S931 to S933, of the print ratio of the print side of the current sheet P and the print ratio of the print side of the subsequent sheet P, a larger one of the print ratios is stored in the print ratio buffer. For example, in the case where the print ratio information on the print side of the current sheet P is 10% and the print ratio information on the print side of the subsequent sheet P is 60%, in the print ratio buffer, a value of 60% which is the print ratio of the print side of the subsequent sheet P is stored. In S934, on the basis of the value of the print ratio stored in the print ratio buffer, the CPU 205 calculates the discharge interval value B corresponding to the print ratio by making reference to the above-described table 1 stored in the ROM 206. For example, in the case where the value of the print ratio buffer is 60%, from the table 1, the discharge interval value B is B60.

In S935, the CPU 205 compares the discharge interval value B calculated in S934 with the value stored in the discharge interval buffer and is discriminates whether or not the calculated discharge interval value B is larger than the value stored in the discharge interval buffer (calculated discharge interval value B>discharge interval buffer ?). The CPU 205 advances the process to S936 in the case where the CPU 205 discriminated that the calculated discharge interval value B is larger than the value stored in discharge interval buffer, and ends the process in the case where the CPU 205 discriminated that the calculated discharge interval value B is not more than the value stored in the discharge interval buffer. In S936, the CPU 205 sets the calculates discharge interval value B as the discharge interval buffer (discharge interval buffer=calculated discharge interval value B), and ends the process. In this embodiment, when the process of S901 is performed, the discharge interval value A is stored in the discharge interval buffer, and B60 which is the discharge interval value acquired in the process S934 is larger than the discharge interval value A, and therefore, the value of the discharge interval buffer is renewed to B60.

Here, an effect for suppressing the occurrence of the discharged sheet sticking phenomenon by the processes of S935 and S936 will be described. By the processes of S935 and S936, after once an image with a high print ratio is printed, a discharge interval of the sheet P set at that time is set, as a maximum of the discharge interval of the sheet P, in the discharge interval buffer which is a storing portion, and thereafter can be maintained. For example, in the case where the print ratio information of the print side of the current sheet P is 10% and the print ratio information of the print side of the subsequent sheet P is 60%, as described above, the discharge interval value of the sheet P is set at B60. In printing of the image on the subsequent sheet P, even in the case where the print ratio information of the print side of the current sheet P is 50% and the print ratio information of the print side of the subsequent sheet is 30%, the discharge interval value of the sheet P can be maintained at B60. Here, when the magnitudes of only the discharge interval values at the print ratios of 30% and 40% are compared and the discharge interval value is set at B40, there is a possibility that the print side where the print ratio of the image which has already been printed in 40% is stuck. For that reason, in order to more suppress the occurrence of the discharged sheet sticking phenomenon, the process of S935 and S936 are provided.

The CPU 205 advances the process to S910 when the above-described process of S907 (setting of the discharge interval value B) is ended. In S910, the CPU 205 sets the value, set in the discharge interval buffer, as the discharge interval value which is a time from discharge of the current sheet onto the discharge tray 65 until the subsequent sheet is discharged, and ends the process. As described above, as the discharge interval buffer, the discharge interval value B (B60 in this case) is set, and therefore, the discharge interval time is set at the discharge interval value B (B60). In the embodiment 1, the discharge interval value B was the discharge interval time in which the discharged sheet sticking phenomenon does not occur when the solid images largest in toner application amount are printed on the double sides of the sheet P. On the other hand, in this embodiment, on the basis of the print ratio information, the discharge interval time is set at the time B60 shorter than the discharge interval value B, so that the discharge interval time is optimized. For that reason, the occurrence of the discharged sheet sticking phenomenon can be suppressed while suppressing a lowering in productivity to a minimum.

Incidentally, there is a possibility that the controller portion 201 takes a time more than assumption to analyze the image data for calculating the print ratio and thus a timing of sending the print ratio information to the CPU 205. For that reason, in the case where the sending of the print ratio information from the controller portion 201 is not in time to a processing timing on the CPU 205 side, the CPU 205 sets the print ratio of the sheet (paper) at 100%, so that the occurrence of the discharged sheet sticking phenomenon can be suppressed.

Further, in the case where a delay of the sending of the print ratio information from the controller portion 201 is known in advance, a lowering in productivity can be suppressed by delaying the sheet in which the discharge interval time is reflected by one sheet. That is, when N is an integer of 3 or more, a sheet feeding interval from feeding of an (N−1)-th sheet P to feeding of an N-th sheet P is controlled by using print ratio information on an upper side of an (N−2)-th sheet P and print ratio information on a lower side of the (N−1)-th sheet P. In the above-described method, a sheet feeding interval from feeding of the (N−2)-th sheet P to feeding of the (N−1)-th sheet P was controlled by using the print ratio information on the upper side of the (N−2)-th sheet P and the print ratio information on the lower side of the (N−1)-th sheet P. For that reason, the timing in which the discharge interval time is reflected is delayed by a time corresponding to one sheet.

(Printing of Image on Second Sheet P (Double-Side Printing: First Side))

Incidentally, the process of the first side of the second sheet P is performed similarly as in the case of the above-described first side since the subsequent sheet P is subjected to the double-side printing on which the image is formed on the second side, so that description thereof will be omitted.

(Printing of Image on Second Sheet P (Double-Side Printing: Second Side))

Next, the process in the case of the second side of the second sheet P in the double-side printing will be described. As regards the second sheet P (double-side printing: second side), S502 (discharge interval setting) of part (a) of FIG. 5 is executed, the "discharge interval setting" process of FIG. 8A is actuated.

In S900, the CPU 205 discriminates whether or not execution is the first execution after turning-on of the main switch of the printer 1, and advances the process to S902 since the execution is third execution.

In S902, the CPU 205 discriminates whether or not there is a subsequent sheet P fed subsequently to the current sheet P. In this case, the CPU 205 receives the print reservation information on the subsequent sheet P from the controller portion 201, and thus discriminates that the subsequent sheet P is present, and then advances the process to S904.

In S904, the CPU 205 discriminates whether or not the subsequent sheet P is subjected to the double-side printing, on the basis of the print reservation information (print information) received from the controller portion 201. The CPU 205 advances the process to S907 in the case where the CPU 205 discriminated that the subsequent P is subjected to the double-side printing, and advances the process to S905 in the case where the CPU 205 discriminated that the subsequent sheet P is not subjected to the double-side printing (i.e., is subjected to the one-side printing). In the case of this embodiment, the subsequent sheet P is subjected to the one-side printing, so that the CPU 205 advances the process to S905.

In S905, the CPU 205 discriminates whether or not a timer starting an operation in the above-described process of S917 is in operation, and the CPU 205 advances the process to S908 in the case where the CPU 205 discriminated that the timer is in operation and advances the process to S906 in the case where the CPU 205 discriminated that the timer is not in operation. The timer does not start the operation until the current print job during execution is discriminated as being ended in the above-described "job end monitoring" process. For that reason, at this point of time, the timer does not operate. For that reason, by the discrimination in S905, the CPU 205 advances the process to S906. Incidentally, the process in the case where the timer operates will be described in the intermittent printing described later.

In S906, the CPU 205 discriminates whether or not the value set as the discharge interval buffer is the discharge interval value A, and the CPU 205 advances the process to S910 in the case where the discharge interval value A is set, and advances the process to S909 in the case where the discharge interval value A is not set. In this embodiment, by the above-described process, the discharge interval value B is set as the discharge interval buffer, and therefore, the CPU 205 advances the process to S909.

In S909, the CPU 205 acquires the print ratio of the print side of the subsequent sheet sent from the controller portion 201, and on the basis of the value of the print ratio stored in the print ratio buffer, the CPU 205 calculates the discharge interval value B corresponding to the print ratio by making reference to the above-described table 1 stored in the ROM 206. For example, in the case where the value of the print ratio buffer is 60%, from the table 1, the discharge interval value C is (B60-T).

Then, the CPU 205 stores the calculated discharge interval value C in the discharge interval buffer, and advances the process to S910. In S910, the CPU 205 sets the value, set in the discharge interval buffer, as the discharge interval value which is a time from discharge of the current sheet onto the discharge tray 65 until the subsequent sheet is discharged, and ends the process.

(Printing of Image on Third Sheet P (One-Side Printing))

Next, a process in the case where a third sheet P is subjected to the one-side printing will be described. As regards the third sheet P (one-side printing), S502 (discharge interval setting) of part (a) of FIG. 5 is executed, the "discharge interval setting" process of FIG. 8A is actuated.

In S900, the CPU 205 discriminates whether or not execution is the first execution after turning-on of the main switch of the printer 1, and the execution is fourth execution, so that the CPU 205 advances the process to S902. In S902, the CPU 205 discriminates whether or not the subsequent sheet P is present. In the print job in this embodiment, three sheets P are subjected to the one-side printing, the double-side printing, and the one-side printing, respectively. For that reason, when the one-side printing for the third sheet P is ended, the print job also ends. For that reason, print reservation information on a fourth sheet P to be subsequently fed is not sent from the controller portion 201. The CPU 205 does not receive the print reservation information on the sheet P, to be subsequently fed, from the controller portion 201, so that the CPU 205 discriminates that the sheet P to be subsequently fed is not present, and then ends the process.

[Intermittent Printing]

Next, control of the discharge interval of the sheet P in the case where intermittent printing in which the print job is resumed after the print job ends. Incidentally, in the case where the resumed print job was the double-side printing, in the above-described discrimination process in S904 of FIG. 8A, the CPU 205 advances the process to S907 and does not advance the process to S905. As a result, in the case where the resumed print job was the double-side printing, the same process as the process in the above-described double-side printing is carried out, and therefore description thereof in this embodiment will be omitted.

When the above-described print job in which the three sheets P are subjected to the one-side printing, the double-side printing, and the one-side printing again ends, in S916 of the "job end monitoring" shown in FIG. 8C, the CPU 205 whether or not the discharge interval value set as the discharge interval buffer equals to the discharge interval value A. As described above, as the discharge interval buffer, the discharge interval value C (B60-T in this embodiment) is set, and therefore, the CPU 205 advances the process to S917. In S917, the CPU 205 resets and starts the timer in order to measure an elapsed time from the end of the above-described print job.

Thereafter, when a print job in which two sheets P are subjected to the one-side printing is executed, S502 (discharge interval setting) of part (a) of FIG. 5 is executed, so that the "discharge interval setting" process of FIG. 8A is actuated.

In S900, the CPU 205 discriminates whether or not the execution is the first execution after the turning-on of the main switch of the printer 1, and the execution is not the first execution, so that the CPU 205 advances the process to S902. In S902, the CPU 205 discriminates whether or not the subsequent sheet P is present. The CPU 205 receives the print reservation information on the subsequent sheet P from the controller portion 201, so that the CPU 205 discriminates that the subsequent sheet P is present, and advances the process to S904.

In S904, on the basis of the print reservation information received from the controller portion 201, the CPU 205 discriminates whether or not the subsequent sheet P is subjected to the double-side printing, and the subsequent sheet P is subjected to the one-side printing, so that the CPU 205 advances the process to S905.

In S905, the CPU 205 discriminates whether or not the timer is in operation. As described above, the timer is in operation, so that the CPU 205 advances the process to S908. In S908, the CPU 205 actuates a "discharge interval setting during intermittent printing" process shown in FIG. 8C in order to set the discharge interval during the intermittent printing.

(Discharge Interval Setting During Intermittent Printing)

In S920, the CPU 205 acquires the print ratio of the print side of the subsequent sheet P sent from the controller portion 201, and calculates the discharge interval value C on the basis of the acquired print ratio and a timer value by making reference to a table 2 stored in the above-described ROM 206. Here, the table 2 is a table in which the print ratio (unit: %) and the timer value (unit: sec) and the discharge interval value C (unit: msec) are coordinated with each other. The table 2 shown below is the table in which the timer value and the discharge interval value C when the print ratio is 60% are coordinated with each other. Incidentally, the discharge interval value C of the Table 2 is a time in which the discharge interval time is decreased from the discharge interval value C at the same print ratio as the table 1 depending on the timer value. For that reason, in the table 2, in the case where the timer value is 0 sec, the value of the discharge interval value C is (B60-T) which is the same as the discharge interval value C of the table 1. On the other hand, in the case where the timer value is 30 sec, the value of the discharge interval value C is a time (B60-T-Tt30) obtained by subtracting the time Tt30 from the discharge interval value C of the table 1. Further, in the case where the timer value is a predetermined time to or more determined in advance, the CPU 205 discriminates that a time enough to cool the sheet P on the discharge tray 65 and the toner on the sheet P has elapsed, so that the discharge interval value C is changed to the discharge interval value A. As described above, the print ratio set as the print ratio buffer was 60%, so that in the case where 30 sec has elapsed after the print job ends, from the table 2, the discharge interval value C is (B60-T-Tt30).

TABLE 2

(Case of print ratio value of 60 [%])

| TV*[1] [sec] | 0 | ... | 30 | ... | Ta |
|---|---|---|---|---|---|
| DIV*[2] C [sec] | B60-T | ... | B60-T-Tt30 | ... | DIV A |

*[1]"TV" is the timer value.
*[2]"DIV" is the discharge interval value.

Subsequently, in S921, the CPU 205 stores the discharge interval value C calculated in S920 in the discharge interval buffer (discharge interval buffer=calculated discharge interval value C). In S922, the CPU 205 discriminates whether or not the value of the discharge interval buffer equals to the discharge interval value A. The CPU 205 advances the process to S923 in the case where the CPU 205 discriminated that the value of the discharge interval buffer equals to the discharge interval value A, and ends the process in the case where the CPU 205 discriminated that the value of the discharge interval buffer equals to the discharge interval value A. In S923, in the case where the value of the discharge interval buffer equals to the discharge interval value A, the CPU 205 discriminates that the time enough to cool the sheet P on the discharge tray 65 and the toner on the sheet P has elapsed, and stops the timer and then ends the process. Incidentally, by stopping the timer, in the case where the one-side printing is carried out again, control is carried out so that the discharge interval of the sheet P becomes the discharge interval value A, and therefore, the throughput becomes maximum.

Then, in S910, the CPU 205 sets the value (time), set as the discharge interval buffer, as the discharge interval (discharge interval time). By this, also in the intermittent printing, the sheet P can be discharged at the discharge interval depending on the elapsed time from the end of the last print job even in the intermittent printing, so that the occurrence of the discharged sheet sticking phenomenon can be suppressed.

As described above, in this embodiment, after a lapse of a time enough to prevent the discharged sheet sticking phenomenon after the end of the current print job, in the one-side printing of the image on the sheet P in the subsequent print job, the through put can be maximum. Further, also, in the case where the presence or absence of the sheet P on the discharge tray 65 is not known, by determining the discharge interval depending on the elapsed time from the end of the last print job, it is possible to suppress the occurrence of the discharged sheet sticking phenomenon. Then, during the execution of the print job, on the basis of the print ratio of the print side of the sheet P, the discharge interval of the sheet P is determined, so that the occurrence of the discharged sheet sticking phenomenon can be suppressed while suppressing a lowering productivity.

In this embodiment, an example in which in the intermittent printing, the sheet discharge interval in the subsequent print job is shortened depending on the elapsed time from the end of the current print job was described, but the present invention is not limited to the constitution of this embodiment. For example, in the case where in the subsequent print job, the one-side printing is continued, the elapsed time from the start of the one-side printing is measured and the sheet discharge interval may also be shortened depending on the elapsed time. Further, the sheet discharge interval may also be shortened depending on the number of sheets subjected to the continuous one-side printing, not the elapsed time. As a simplest example, it is possible to cite an example in which in the subsequent print job, the sheet discharge interval of the first sheet of the one-side printing is set at the discharge interval value C but the sheet discharge interval of the second sheet and later of the one-side printing is set at the discharge interval value A.

As described above, according to this embodiment, the occurrence of the discharged sheet sticking phenomenon can be suppressed.

Embodiment 3

In the embodiments 1 and 2, the embodiments in which the control of suppressing the discharged sheet sticking phenomenon is carried out were described. In an embodiment 3, control in a printer in which the user is capable of setting enablement or disablement of discharged sheet sticking phenomenon suppressing control will be described. Further, also, an operation in the case where the printer urgently stops the image forming operation due to a socalled jam such that the sheet during feeding stops on the feeding passage and then the operation is resumed will be described.

Incidentally, similarly as in the embodiment 2, the printer 1 of this embodiment is similar to the printer 1 shown in FIG. 1 of the embodiment 1 except that the discharged sheet sensor 216 is not provided, so that description will be omitted by using the same reference numerals or symbols for the same constituent elements. Further, also as regards a constitution of a control system of the printer 1 of this embodiment, the same constitution is employed except that the discharged sheet sensor 216 is not provided in the block diagram shown in FIG. 2 of the embodiment 1.

[Discharge Interval Control of Sheet]

In this embodiment, a method of discharge interval control of the sheet will be described using a print job in which a first sheet is subjected to the double-side printing, a second sheet is subjected to the one-side printing, and a third sheet is subjected to the double-side printing again and thus the one-side printing and the double-side printing are performed in mixture will be described.

Further, the printer 1 of this embodiment includes a display portion where various pieces of information are displayed, and an operating portion (not shown) where a key pad and operating buttons which are used for data input and function setting. Further, the user makes setting of enabling or disabling the above-described control of the discharged sheet sticking phenomenon by operating the operating buttons of the operating portion.

Further, when the CPU 205 of the engine controller 202 monitors the occurrence of the above-described jam and detects the jam, the CPU 205 not only sets information, in the RAM 207, that the occurrence of the jam is detected, but also stops the image forming operation during execution. Incidentally, for example, on the basis of a detection result from the top sensor 215 or the discharge sensor 217, the CPU 205 detects the occurrence of the jam by no detection of a leading end of the sheet even when a predetermined time has elapsed or no passing of a trailing end of the sheet P even when a predetermined time has elapsed.

The discharge interval control of the sheet P in this embodiment include four steps from a step 1 to a step 4 similarly as in the case of the embodiment 1, but in this embodiment, only the "discharge interval setting" procedure of the step 1 is different from the "discharge interval setting" procedure of the step 1 in the embodiments 1 and 2. The processes of other steps, i.e., the "discharge interval calculation" of the step 2, the "discharge interval control" of the step 3, and the "sheet feeding control" of the step 4 are similar to the processes described in the embodiment 1 and will be omitted from the description in this embodiment.

Part (a) of FIG. 9A shows a flow chart showing a control sequence of the "discharge interval setting" in this embodiment. The process of the "discharge interval setting" is actuated from the "sheet feeding control" of the step 4 similarly as in the embodiment 1, and the process shown in part (a) of FIG. 9 is executed by the CPU 205. Part (b) of FIG. 9 shows a flow chart showing a control sequence of an "abnormal stop monitoring" for monitoring actuation of an abnormal stop process due to the jam occurrence.

[Abnormal Stop Monitoring]

In this embodiment, when the image forming operation of the printer 1 is started, monitoring of the jam occurrence which is a state in which the sheet P remains on the feeding passage is carried out. For that reason, the "abnormal stop monitoring" shown in part (b) of FIG. 9 is also actuated simultaneously with a start of the image forming operation, and the process is executed by the CPU 205.

In S1120, the CPU 205 discriminates whether or not the jam occurred by making reference to the above-described RAM 207, and advances the process to S1121 in the case where the CPU 205 discriminated that the jam occurs and returns the process to S1120 in the case where the CPU 205 discriminated that the jam does not occur.

In S1121, the CPU 205 sets an abnormality occurrence flag and ends the process.

[Step 1: "Discharge Interval Setting"]

In order to execute the print job in this embodiment, the process of part (a) of FIG. 5 is actuated, and double-side printing of the image on the first sheet P is started. Then, when S502 (discharge interval setting) of part (a) is executed, the process of "discharge interval setting" of part (a) of FIG. 9 is actuated.

In step 1100, the CPU 205 discriminates whether or not execution of the "discharge interval setting" is first execution after turning-on of a main switch of the printer 1, and advances the process to S1102 in the case where the CPU 205 discriminated that the execution is the first execution and advances the process to S1101 in the case where the CPU 205 discriminated that the execution is second execution or later execution. In S1101, in order that the CPU 205 discriminates whether or not the jam occurs and actuation is first actuation after jam clearance, the CPU 205 discriminates whether or not an emergency stop occurrence flag is set. The CPU 205 advances the process to S1102 in the case where the CPU 205 discriminated that the emergency stop occurrence flag is set, and advances the process to S1103 in the case where the CPU 205 discriminated that the emergency stop occurrence flag is not set. In S1102, the CPU 205 sets the discharge interval value A as the discharge interval buffer and resets the emergency stop occurrence flag. Incidentally, in this embodiment, in the case where the jam occurs and the actuation is the first actuation after the jam clearance, the sheet P on the discharge tray 65 is removed, or the sheet P on the discharge tray 65 or the toner on the sheet P is sufficiently cooled. For that reason, in S1102, the CPU 205 sets, as the discharge interval buffer, the discharge interval value A which is the shortest discharge interval time.

Subsequently, the process of S1103 will be described depending on a setting state of enablement/disablement of the above-described discharged sheet sticking phenomenon suppression control. In S1103, the CPU 205 discriminates whether or not the discharged sheet sticking phenomenon suppression control is enable, and the CPU 205 advances the process to S1104 in the case where the discharged sheet sticking phenomenon suppression control is enable, and advances the process to S1108 in the case where the discharged sheet sticking phenomenon suppression control is not enable (i.e., disable).

(Case that Discharged Sheet Sticking Phenomenon Suppression Control is Enable)

In the process of S1103, in the case where the CPU 205 discriminated that the discharged sheet sticking phenomenon suppression control is enable, subsequent processes in part (a) of FIG. 9 are similar to the process of FIG. 3 in the embodiment 1. That is, the processes of S1104, S1106, S1107 and S1109 to S1111 are similar to the processes of S302, S304, S305, S306, S307, and S310, respectively, and thus will be omitted from description in this embodiment. The print job in this embodiment is carried out so that the first sheet p is subjected to the double-side printing, the second sheet P is subjected to the one-side printing, and the third sheet P is subjected to the double-side printing. For that reason, in the double-side printing of the image on the first sheet P, in the process of S1109, the discharge interval value B is set as the direction. Next, when the printing is switched to the one-side printing of the image on the second sheet P, in the process of S1110, the discharge interval value C is set as the discharge interval buffer, so that even in the one-side printing, the occurrence of the discharged sheet sticking phenomenon can be suppressed. Then, the printing is switched again to the double-side printing in which the image is formed on the third sheet P, in the process of S1109, the discharge interval value B is set again as the discharge interval buffer, so that the occurrence of the discharged sheet sticking phenomenon can be suppressed.

Further, in the case where the emergency stop process occurs due to the jam occurrence and the printing during the first actuation after the jam clearance is the one-side printing, the discharge interval is set at discharge interval value A. As described above, when the discharge interval is set at the discharge interval value A, the throughput of the printer 1 becomes maximum. Therefore, in the case where the printing after restoration from the emergency stop is the one-side printing, the throughput becomes maximum. On the other hand, in the case where the printing after restoration from the emergency stop is the double-side printing, the discharge interval is set at the discharge interval value B (S1109), and therefore, the occurrence of the discharged sheet sticking phenomenon can be suppressed.

(Case that Discharged Sheet Sticking Phenomenon Suppression Control is Disable)

In the case where in S1103, the user designates the enablement/disablement designation of the discharged sheet sticking phenomenon suppression control as disablement, the CPU 205 advances the process to S1108. In S1108, the CPU 205 sets the discharge interval buffer A as the discharge interval buffer even in the case of the double-side printing and even in the case of the one-side printing, and advances the process to S1111. In S1111, the CPU 205 sets, as the discharge interval, the discharge interval value A set as the discharge interval buffer, and ends the process.

When the discharge interval value A is set as the discharge interval, the discharge interval is set at 0 in the "discharge interval calculation" in the step 2 shown in FIG. 6 of the embodiment 1 (S606), so that permission of the sheet feeding is outputted immediately in the "discharge interval control" of the step 3 shown in FIG. 4 of the embodiment 1 (S403). By this, the throughput becomes maximum, while the discharged sheet sticking phenomenon suppression control is not carried out, and therefore, the discharged sheet sticking phenomenon occurs in some cases.

As described above, in the case where the user sets the discharged sheet sticking phenomenon suppression control at enablement, it is possible to suppress the occurrence of the discharged sheet sticking phenomenon, and in the case where the user sets the discharged sheet sticking phenomenon suppression control at disablement, it is possible to perform the image forming operation in which priority is given to productivity. Further, description that the throughput can be maximized by setting the discharge interval at the discharge interval value A in the one-side printing immediately after the emergency stop of the image forming operation occurs due to the jam and the image forming operation is restored from the emergency stop was made. In this embodiment, in the case where the emergency stop occurs, on the assumption that the user removes not only the jammed sheet (paper) but also the sheet P on the discharge tray 65, the control in which the priority is given to the productivity after restoration from the emergency stop is carried out.

Incidentally, the present invention is not limited to the constitutions of the above-described embodiments. For example, in the case where the user desires to suppress the occurrence of the discharged sheet sticking phenomenon than improvement of the productivity after the restoration from the emergency stop, the elapsed time from the occurrence of the emergency stop is measured, and similarly as in the embodiment 2, the discharge interval of the sheet P may also be shortened depending on the elapsed time. Further, the discharge interval of the sheet P may also be shortened depending on the number of sheets P subjected to the printing after the restoration from the emergency stop.

Further, in this embodiment, as the example of the printer 1, the monochromatic printer was described, but the present invention is not limited to the constitution of the monochromatic printer. In a color printer for forming a color image, a plurality of process cartridges different in color of toner are provided and toner images different in color formed by the respective process cartridges transferred superposedly onto an intermediary transfer belt, so that the color images are formed on the intermediary transfer belt. Then, the color images are transferred from the intermediary transfer belt onto the sheet P fed from the sheet feeding tray, and are pressed and heated by the fixing device, so that the color images are fixed on the sheet P. In the case of the printer 1 in this embodiment, the sheet feeding interval control was carried out, but in the case of the color printer, different from the monochromatic printer, there is a latitude in sheet feeding interval, and therefore, the discharge interval can be controlled as in the above-described embodiments by controlling an image writing interval.

As described above, according to the above-described embodiments, the occurrence of the discharged sheet sticking phenomenon on the discharge tray can be suppressed.

According to the present invention, it is possible to suppress the occurrence of the discharged sheet sticking phenomenon on the discharge tray.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-144818 filed on Aug. 28, 2020, which is hereby incorporated by reference herein in its entirety.

What is claimed is:

1. An image forming apparatus comprising:
a stacking unit configured to stack a recording material;
a feeding unit configured to feed the recording material stacked on said stacking unit;
an image forming unit configured to form an image on the recording material;
a discharge stacking unit configured to stack a discharged recording material;
a detecting unit configured to detect the recording material to be discharged on said discharge stacking unit;
a double-side feeding passage along which the recording material, on which the image is formed on one side by said image forming unit to form images on double sides of the recording material, is fed; and
a controller configured to control feeding of the recording material by said feeding unit, wherein in a case that subsequent to a current recording material, a subsequent recording material is discharged on said discharge stacking unit, said controller, (1) determines a feeding timing of the subsequent recording material depending on a discharge interval time from discharge of the current recording material on said discharge stacking unit to discharge of the subsequent recording material on said discharge stacking unit, and (2) determines the discharge interval time on the basis of print information of at least the subsequent recording material, wherein in a case that the current recording material is subjected to one-side printing in which the image is formed on the one side of the recording material, said controller determines the feeding timing of the subsequent recording material when the current recording material is fed from said stacking unit by said feeding unit, and wherein in a case that the current recording material is subjected to double-side printing in which the images are formed on the double sides of the recording material, said controller determines the feeding timing of the subsequent recording material when the current recording material is fed from said double-side feeding passage.

2. An image forming apparatus according to claim 1, wherein the print information is the one-side printing for the subsequent recording material or the double-side printing for the subsequent recording material.

3. An image forming apparatus according to claim 2, wherein the discharge interval time is a time from detection of passing of the current recording material by said detecting unit to detection of passing of the subsequent recording material by said detecting unit.

4. An image forming apparatus according to claim 3, wherein the discharge interval time when the recording material of the one-side printing is discharged on said discharge stacking unit in a state in which there is no recording material discharged on said discharge stacking unit is a first discharge interval time, wherein the discharge interval time when the subsequent recording material of the one-side printing is discharged on said discharge stacking unit is a second discharge interval time, wherein the discharge interval time when the current recording material is subjected to the double-side printing and the subsequent recording material of the one-side printing is discharged on said discharge stacking unit is a third discharge interval time, and wherein the first discharge interval time, the second discharge interval time, and the third discharge interval time satisfy the following relationship:

(first discharge interval time)<(third discharge interval time)≤(second discharge interval time).

5. An image forming apparatus according to claim 4, wherein in a case that the subsequent recording material is subjected to the double-side printing, said controller determines the feeding timing of the subsequent recording material on the basis of a time obtained by adding a time from feeding of the current recording material to passing of the current recording material through said detecting unit and adding the second discharge interval time and then by subtracting, from a resultant time, a time from feeding of the subsequent recording material from said stacking unit by said feeding unit until the subsequent recording material is fed along said double-side feeding passage and passes through said detecting unit.

6. An image forming apparatus according to claim 4, wherein in a case that the subsequent recording material is subjected to the one-side printing, said controller determines the feeding timing of the subsequent recording material on the basis of a time obtained by adding a time from feeding of the current recording material to passing of the current recording material through said detecting unit and adding the first discharge interval time or the third discharge interval time and then by subtracting, from a resultant time, a time from feeding of the subsequent recording material from said stacking unit by said feeding unit until the subsequent recording material is fed along said double-side feeding passage and passes through said detecting unit.

7. An image forming apparatus according to claim 5, further comprising a recording material detecting unit configured to detect presence or absence of the recording material stacked on said discharge stacking unit, wherein said controller sets the third discharge interval time at the first discharge interval time in a case that said recording material detecting unit detects that the recording material is absence on said discharge stacking unit.

8. An image forming apparatus according to claim 7, wherein the second discharge interval time and the third discharge interval time are capable of being changed depending on a print ratio of the recording material on a print side.

9. An image forming apparatus according to claim 8, wherein the print ratio of the recording material subjected to the double-side printing includes a larger print ratio on an associated print side and a smaller print ratio on an associated print side, the larger print ratio being the print ratio of the recording material.

10. An image forming apparatus according to claim 9, wherein in a case that the subsequent recording material is subjected to the double-side printing, said controller determines the second discharge interval time of the subsequent recording material on the basis of a larger one of the print ratio of the current recording material and the print ratio of the subsequent recording material.

11. An image forming apparatus according to claim 10, further comprising a storing portion configured to store a maximum of the determined second discharge interval time, wherein said controller determines the determined second discharge interval time so as not to be shorter than the maximum stored in said storing portion.

12. An image forming apparatus according to claim 11, wherein depending on an elapsed time from an end of a current print job to execution of a subsequent print job, said controller is capable of changing the third discharge interval time in the subsequent print job.

13. An image forming apparatus according to claim 12, wherein when the elapsed time exceeds a predetermined time, said controller sets the third discharge interval time at the first discharge interval time.

14. An image forming apparatus according to claim 11, wherein when the subsequent print job is executed after the current print job is ended, said controller is capable of changing the third discharge interval time depending on a number of recording materials subjected to the one-side printing in the subsequent print job.

15. An image forming apparatus according to claim 14, wherein when the subsequent print job is executed after the current print job is ended, said controller sets, at the first discharge interval time, the third discharge interval time of a second recording material of the recording materials subjected to continuous one-side printing in the subsequent print job.

16. An image forming apparatus according to claim 7, wherein said controller sets, at the first discharge interval time, the third discharge interval time of a first recording material after clearance of a jammed recording material is ended.

\* \* \* \* \*